US012769885B2

(12) United States Patent
Chalk et al.

(10) Patent No.: US 12,769,885 B2
(45) Date of Patent: Oct. 20, 2026

(54) SYSTEMS AND METHODS FOR SECURE MULTI-MODEL TRAINING WITHIN A ZERO-TRUST ENVIRONMENT

(71) Applicant: BeeKeeperAI, Inc., Austin, TX (US)

(72) Inventors: Mary Elizabeth Chalk, Austin, TX (US); Robert Derward Rogers, Oakland, CA (US); Alan Donald Czeszynski, Pleasanton, CA (US)

(73) Assignee: BeeKeeperAI, Inc., Austin, TX (US)

( * ) Notice: Subject to any disclaimer, the term of this patent is extended or adjusted under 35 U.S.C. 154(b) by 224 days.

(21) Appl. No.: 18/307,778

(22) Filed: Apr. 26, 2023

(65) Prior Publication Data

US 2024/0020417 A1 Jan. 18, 2024

Related U.S. Application Data

(60) Provisional application No. 63/336,865, filed on Apr. 29, 2022.

(51) Int. Cl.

*G06F 21/62* (2013.01)
*G06F 21/57* (2013.01)
*G06F 21/60* (2013.01)

(52) U.S. Cl.

CPC ........ *G06F 21/6263* (2013.01); *G06F 21/577* (2013.01); *G06F 21/602* (2013.01)

(58) Field of Classification Search

CPC .. G06F 21/6263; G06F 21/577; G06F 21/602; G06F 21/6245; G06F 16/35;

(Continued)

(56) References Cited

U.S. PATENT DOCUMENTS

2016/0315930 A1* 10/2016 Kim ........................ G06F 21/41
2018/0341851 A1* 11/2018 Chung .................. G06N 3/082

(Continued)

OTHER PUBLICATIONS

ISA/US, "Notification of Transmittal of the ISR and the Written Opinion of the International Searching Authority, or the Declaration," in PCT Application No. PCT/US2023/066280, Sep. 21, 2023, 15 pages.

(Continued)

*Primary Examiner* — Wasika Nipa
*Assistant Examiner* — Edgar W Xie
(74) *Attorney, Agent, or Firm* — IP strategy Consulting

(57) ABSTRACT

Systems and methods for federated localized feedback and performance tracking of an algorithm is provided. An encrypted algorithm and data are provided to a sequestered computing node. The algorithm is decrypted and processes the protected information to generate inferences from dataframes which are provide to an inference interaction server, which performs feedback processing on the inference/dataframe pairs. Further, a computerized method of secure model generation in a sequestered computing node is provided, using automated multi-model training, leaderboard generation and then optimization. The top model is then selected and security processing on the selected model may be performed. Also, systems and methods are provided for the mapping of data input features to a data profile to prevent data exfiltration. Data consumed is broken out by features, and the features are mapped to either sensitive or non-sensitive classifications. The sensitive information may be obfuscated, while the non-sensitive information may be maintained.

5 Claims, 30 Drawing Sheets

(58) Field of Classification Search
CPC ...... G06F 40/00; G06F 40/30; G06F 21/6254; G06F 16/353; G06F 16/285; G06N 20/00; G06N 5/04; G06N 3/08; G06N 3/09; G06N 3/02; G06N 3/0985; G06N 3/042; H04L 63/0428; H04L 2209/42; H04L 2209/46; H04L 2209/08; H04L 2209/04; G06V 10/70; G06V 10/40; G16H 50/70; G16H 10/60
See application file for complete search history.

(56) References Cited

U.S. PATENT DOCUMENTS

| | | | | |
|---|---|---|---|---|
| 2018/0365525 | A1* | 12/2018 | Zhang | G06F 18/2148 |
| 2019/0087744 | A1 | 3/2019 | Schiemenz | |
| 2019/0220975 | A1 | 7/2019 | Hsieh et al. | |
| 2020/0184382 | A1 | 6/2020 | Fishkov et al. | |
| 2020/0311300 | A1* | 10/2020 | Callcut | G06N 20/00 |
| 2020/0349288 | A1 | 11/2020 | Jun et al. | |
| 2021/0209247 | A1 | 7/2021 | Mohassel et al. | |
| 2021/0248268 | A1 | 8/2021 | Ardhanari et al. | |
| 2021/0264025 | A1* | 8/2021 | Givental | G06N 3/0464 |
| 2021/0390466 | A1 | 12/2021 | Varadarajan et al. | |
| 2022/0114478 | A1 | 4/2022 | Sung et al. | |
| 2022/0405623 | A1* | 12/2022 | Cheng | G06N 20/20 |
| 2024/0202351 | A1* | 6/2024 | Mohammed | G06F 8/60 |

OTHER PUBLICATIONS

European Patent Office, "The partial Supplementary European search report (R. 164 EPC)", in European Application No. 23797532.1 dated Feb. 13, 2026, 16 pages.

Do Le Quoc et al: "SecFL: Confidential Federated Learning using TEEs", arxiv.org, Cornell University Library, 201 Olin Library Cornell University Ithaca, NY 14853, Oct. 3, 2021 (Oct. 3, 2021), XP091071503.

* cited by examiner

SYSTEMS AND METHODS FOR SECURE MULTI-MODEL TRAINING WITHIN A ZERO-TRUST ENVIRONMENT

BACKGROUND

The present invention relates in general to the field of zero-trust computing, and more specifically to methods, computer programs and systems for federated feedback in a zero-trust environment. Federated feedback is a group of methodologies to generate and collect, on an ongoing basis, performance data from an algorithm that has been deployed to generate inferences in potentially many different deployment sites, and which can collect, store, analyze and report on these data without the requirement to transmit these data outside of the local deployment site. Such systems and methods are particularly useful in situations where algorithm developers wish to maintain secrecy of their algorithms, and the data being processed is highly sensitive, such as protected health information. For avoidance of doubt, an algorithm may include a model, code, pseudo-code, source code, or the like.

Within certain fields, there is a distinguishment between the developers of algorithms (often machine learning of artificial intelligence algorithms), and the stewards of the data that said algorithms are intended to operate with and be trained by. On its surface this seems to be an easily solved problem of merely sharing either the algorithm or the data that it is intended to operate with. However, in reality, there is often a strong need to keep the data and the algorithm secret. For example, the companies developing their algorithms may have the bulk of their intellectual property tied into the software comprising the algorithm. For many of these companies, their entire value may be centered in their proprietary algorithms. Sharing such sensitive data is a real risk to these companies, as the leakage of the software base code could eliminate their competitive advantage overnight.

One could imagine that instead, the data could be provided to the algorithm developer for running their proprietary algorithms and generation of the attendant reports. However, the problem with this methodology is two-fold. Firstly, often the datasets for processing and extremely large, requiring significant time to transfer the data from the data steward to the algorithm developer. Indeed, sometimes the datasets involved consume petabytes of data. The fastest fiber optics internet speed in the US is 2,000 MB/second. At this speed, transferring a petabyte of data can take nearly seven days to complete. It should be noted that most commercial internet speeds are a fraction of this maximum fiber optic speed.

The second reason that the datasets are not readily shared with the algorithm developers is that the data itself may be secret in some manner. For example, the data could also be proprietary, being of a significant asset value. Moreover, the data may be subject to some control or regulation. This is particularly true in the case of medical information. Protected health information, or PHI, for example, is subject to a myriad of laws, such as HIPAA, that include strict requirements on the sharing of PHI, and are subject to significant fines if such requirements are not adhered to.

Healthcare related information is of particular focus of this application. Of all the global stored data, about 30% resides in healthcare. This data provides a treasure trove of information for algorithm developers to train their specific algorithm models (AI or otherwise), and allows for the identification of correlations and associations within datasets. Such data processing allows advancements in the identification of individual pathologies, public health trends, treatment success metrics, and the like. Such output data from the running of these algorithms may be invaluable to individual clinicians, healthcare institutions, and private companies (such as pharmaceutical and biotechnology companies). At the same time, the adoption of clinical AI has been slow. More than 12,000 life-science papers described AI and ML in 2019 alone. Yet the U.S. Food and Drug Administration (FDA) has only approved only approximately 150 AI/ML-based medical devices to date. Data access is a major barrier to regulatory market clearance and to clinical adoption. The FDA requires proof that a model works across the intended population. However, privacy protections make it challenging to access enough diverse data to accomplish this goal.

For many of the same reasons as it is difficult to share the PHI and/or algorithms between the parties, the sharing of feedback from the operation of the algorithms poses similar challenges. This is important because feedback regarding algorithm performance is necessary for tuning models, for performance tracking, generating of command sets for the algorithm operation, and for regulatory and other similar purposes.

Given that there is great value in the operation of secret algorithms on data that also must remain secret, there is a significant need for systems and methods that allow for such zero-trust operations. Within such zero-trust environments there is likewise a need for the ability to collect and dispose of feedback, perform federated training, advanced automated multi-model learning, and methods for the ensuring security of models. Such systems and methods enable sensitive data to be analyzed in a secure environment, providing the needed outputs, and using these outputs for feedback loops, while maintaining secrecy of both the algorithms involved, as well as the data itself.

SUMMARY

The present systems and methods relate to federated feedback within a secure and zero-trust environment. Such systems and methods enable improvements in the ability to identify associations in data that traditionally require some sort of risk to the algorithm developer, the data steward, or both parties. In addition to making these inferences, there is a need to enable feedback locally (for model tuning and validation) as well as the ability to provide performance data and/or results of performance analysis from algorithms operating within individually protected environments or nodes back to an external common aggregation node (federated feedback).

In some embodiments, the method of federated localized feedback and performance tracking of an algorithm includes routing an encrypted algorithm to a sequestered computing node. The sequestered computing node is located within a data steward's environment, but the data steward is unable to decrypt the algorithm. Data steward then provides protected information to the node. The algorithm is decrypted and processes the protected information to generate inferences from dataframes. The dataframes and inferences are decrypted as they exit the secure node, and are provided to an inference interaction server, which performs feedback processing on the inference/dataframe pairs.

In some embodiments, a computerized method of secure model generation in a sequestered computing node is provided. The algorithm may be subjected to automated multi-model training. A leaderboard of the resulting trained models is generated and then optimized for. The top model is then selected and security processing on the selected model may be performed. In some embodiments, this entire process occurs in a single data steward's secure computing node. In other instances, this process may occur in an aggregation server, where models from many different data stewards are combined (e.g., federated training). The optimization of models in the leaderboard may be based upon model accuracy, the risk of data exfiltration by the model, or by some combination.

The security processing of the selected model may include measuring the exfiltration risk of the model, and either truncating weights or adding superfluous weights until the desired level of security is met. In some embodiments, a report of the model's performance may be output for validation. In some cases, the validation report may be provided to a separate computing node within the same data steward. This second computing node is distinct from the node in which the model was trained and is not accessible by the model. Because this second computing node is located within the same data steward, however, it is possible to get access to the training data and compare the report to said data. Evidence of any data exfiltration may thus be ascertained.

In yet other embodiments, systems and methods are provided for the mapping of data input features to a data profile to prevent data exfiltration. In these systems, the data consumed is broken out by features, and the features are mapped to either sensitive or non-sensitive classifications. Free form text may be automatically determined to be sensitive information. Sensitive vs non-sensitive information may be defined by HIPPA, other regulations, or by a prescribed specification. The sensitive information may be subjected to various obfuscation techniques, while the non-sensitive information may be maintained in a non-altered state.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

Figure 1A:
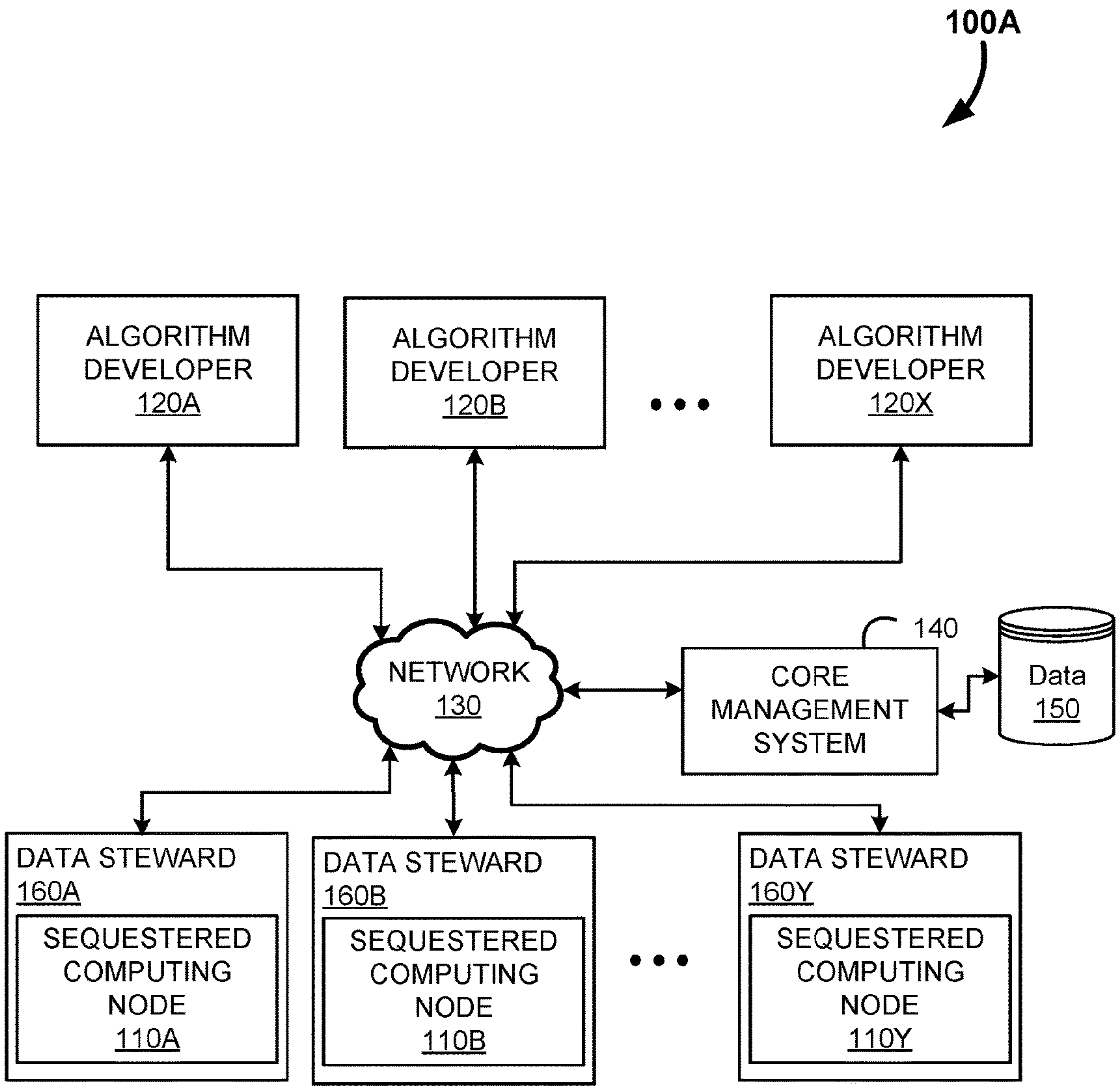
FIGS. 1A and 1B are example block diagrams of a system for zero-trust computing of data by an algorithm, in accordance with some embodiment.

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "always," "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

The present invention relates to systems and methods for the zero-trust application on one or more algorithms processing sensitive datasets. Such systems and methods may be applied to any given dataset, but may have particular utility within the healthcare setting, where the data is extremely sensitive. As such, the following descriptions will center on healthcare use cases. This particular focus, however, should not artificially limit the scope of the invention. For example, the information processed may include sensitive industry information, payroll or other personally identifiable information, or the like. As such, while much of the disclosure will refer to protected health information (PHI) it should be understood that this may actually refer to any sensitive type of data. Likewise, while the data stewards are generally thought to be a hospital or other healthcare entity, these data stewards may in reality be any entity that has and wishes to process their data within a zero-trust environment.

In some embodiments, the following disclosure will focus upon the term "algorithm". It should be understood that an algorithm may include machine learning (ML) models, neural network models, or other artificial intelligence (AI) models. However, algorithms may also apply to more mundane model types, such as linear models, least mean squares, or any other mathematical functions that convert one or more input values, and results in one or more output models.

Also, in some embodiments of the disclosure, the terms "node", "infrastructure" and "enclave" may be utilized. These terms are intended to be used interchangeably and indicate a computing architecture that is logically distinct (and often physically isolated). In no way does the utilization of one such term limit the scope of the disclosure, and these terms should be read interchangeably. To facilitate discussions, FIG. 1A is an example of a zero-trust infrastructure, shown generally at 100*a*. This infrastructure includes one or more algorithm developers 120*a-x* which generate one or more algorithms for processing of data, which in this case is held by one or more data stewards 160*a-y*. The algorithm developers are generally companies that specialize in data analysis, and are often highly specialized in the types of data that are applicable to their given models/algorithms. However, sometimes the algorithm developers may be individuals, universities, government agencies, or the like. By uncovering powerful insights in vast amounts of information, AI and machine learning (ML) can improve care, increase efficiency, and reduce costs. For example, AI analysis of chest x-rays predicted the progression of critical illness in COVID-19. In another example, an image-based deep learning model developed at MIT can predict breast cancer up to five years in advance. And yet another example is an algorithm developed at University of California San Francisco, which can detect pneumothorax (collapsed lung) from CT scans, helping prioritize and treat patients with this life-threatening condition—the first algorithm embedded in a medical device to achieve FDA approval.

Likewise, the data stewards may include public and private hospitals, companies, universities, governmental agencies, or the like. Indeed, virtually any entity with access to sensitive data that is to be analyzed may be a data steward.

The generated algorithms are encrypted at the algorithm developer in whole, or in part, before transmitting to the data stewards, in this example ecosystem. The algorithms are transferred via a core management system 140, which may supplement or transform the data using a localized datastore 150. The core management system also handles routing and deployment of the algorithms. The datastore may also be leveraged for key management in some embodiments that will be discussed in greater detail below.

Each of the algorithm developer 120*a-x*, and the data stewards 160*a-y* and the core management system 140 may be coupled together by a network 130. In most cases the network is comprised of a cellular network and/or the internet. However, it is envisioned that the network includes any wide area network (WAN) architecture, including private WAN's, or private local area networks (LANs) in conjunction with private or public WANs.

In this particular system, the data stewards maintain sequestered computing nodes 110*a-y* which function to actually perform the computation of the algorithm on the dataset. The sequestered computing nodes, or "enclaves", may be physically separate computer server systems, or may encompass virtual machines operating within a greater network of the data steward's systems. The sequestered computing nodes should be thought of as a vault. The encrypted algorithm and encrypted datasets are supplied to the vault, which is then sealed. Encryption keys 390 unique to the vault are then provided, which allows the decryption of the data and models to occur. No party has access to the vault at this time, and the algorithm is able to securely operate on the data. The data and algorithms may then be destroyed, or maintained as encrypted, when the vault is "opened" in order to access the report/output derived from the application of the algorithm on the dataset. Due to the specific sequestered computing node being required to decrypt the given algorithm(s) and data, there is no way they can be intercepted and decrypted. This system relies upon public-private key techniques, where the algorithm developer utilizes the public key 390 for encryption of the algorithm, and the sequestered computing node includes the private key in order to perform the decryption. In some embodiments, the private key may be hardware (in the case of Azure, for example) or software linked (in the case of AWS, for example).

In some particular embodiments, the system sends algorithm models via an Azure Confidential Computing environment to two data steward environments. Upon verification, the model and the data entered the Intel SGX sequestered enclave where the model is able to be validated against the protected information, for example PHI data sets. Throughout the process, the algorithm owner cannot see the data, the data steward cannot see the algorithm model, and the management core can see neither the data nor the model.

The data steward uploads encrypted data to their cloud environment using an encrypted connection that terminates inside an Intel SGX-sequestered enclave. Then, the algorithm developer submits an encrypted, containerized AI model which also terminates into an Intel SGX-sequestered enclave. A key management system in the management core enables the containers to authenticate and then run the model on the data within the enclave. The data is encrypted by the DS and then uploaded to cloud storage. When ready to run, the data is ingested into the enclave in the encrypted state. The data steward never sees the algorithm inside the container and the data is never visible to the algorithm developer. Neither component leaves the enclave. After the model runs, the developer receives a performance report on the values of the algorithm's performance along with a summary of the data characteristics. Finally, the algorithm owner may request that an encrypted artifact containing information about validation results is stored for regulatory compliance purposes and the data and the algorithm are wiped from the system.

Figure 1B:
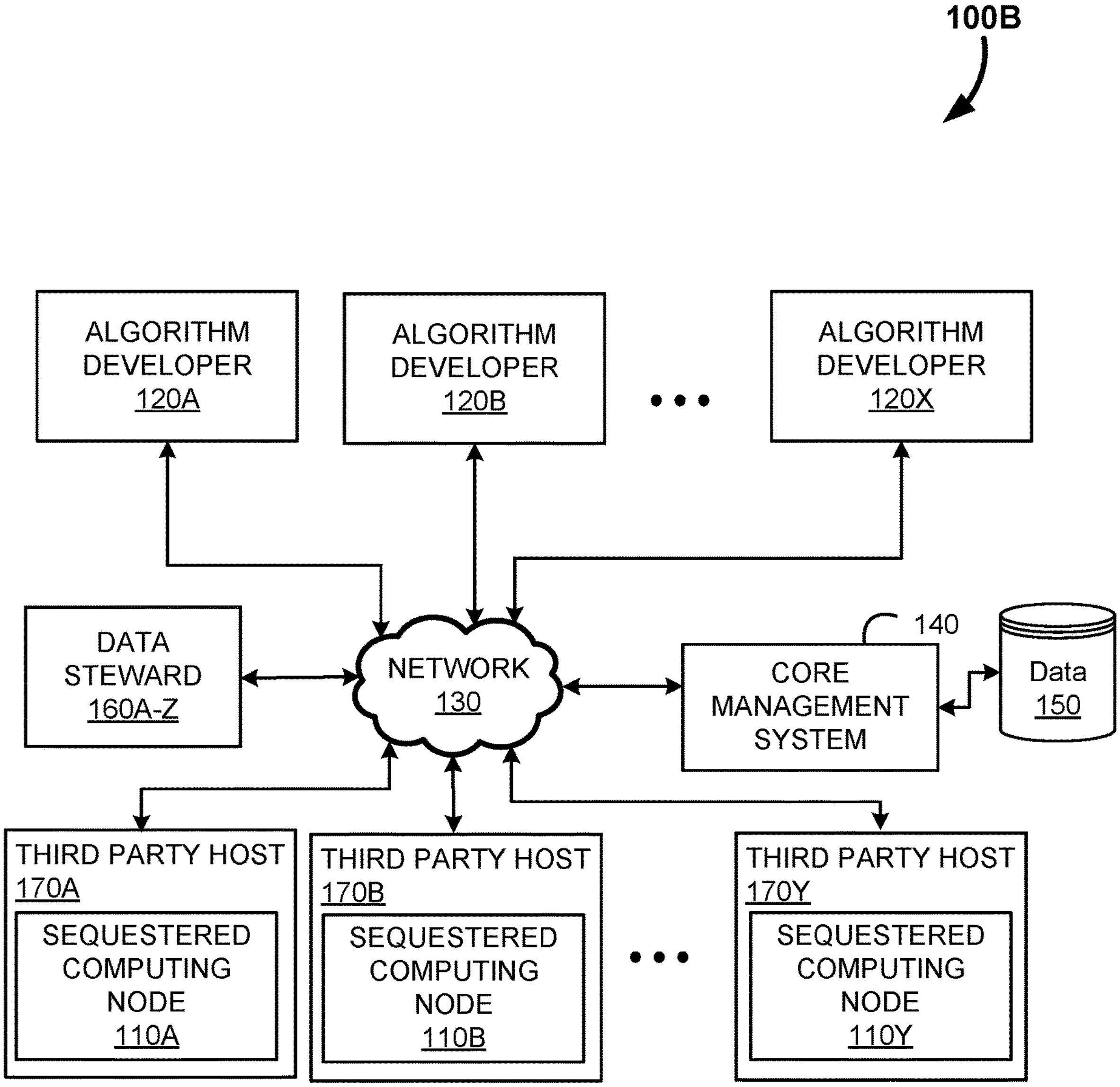

FIG. 1B provides a similar ecosystem 100*b*. This ecosystem also includes one or more algorithm developers 120*a-x*, which generate, encrypt and output their models. The core management system 140 receives these encrypted payloads, and in some embodiments, transforms or augments unencrypted portions of the payloads. The major difference between this substantiation and the prior figure, is that the sequestered computing node(s) 110*a-y* are present within a third party host 170*a-y*. An example of a third-party host may include an offsite server such as Amazon Web Service (AWS) or similar cloud infrastructure. In such situations, the data steward encrypts their dataset(s) and provides them, via the network, to the third party hosted sequestered computing node(s) 110*a-y*. The output of the algorithm running on the dataset is then transferred from the sequestered computing node in the third-party, back via the network to the data steward (or potentially some other recipient).

In some specific embodiments, the system relies on a unique combination of software and hardware available through Azure Confidential Computing. The solution uses virtual machines (VMs) running on specialized Intel processors with Intel Software Guard Extension (SGX), in this embodiment, running in the third party system. Intel SGX creates sequestered portions of the hardware's processor and memory known as "enclaves" making it impossible to view data or code inside the enclave. Software within the management core handles encryption, key management, and workflows.

In some embodiments, the system may be some hybrid between FIGS. 1A and 1B. For example, some datasets may be processed at local sequestered computing nodes, especially extremely large datasets, and others may be processed at third parties. Such systems provide flexibility based upon computational infrastructure, while still ensuring all data and algorithms remain sequestered and not visible except to their respective owners.

Figure 2:
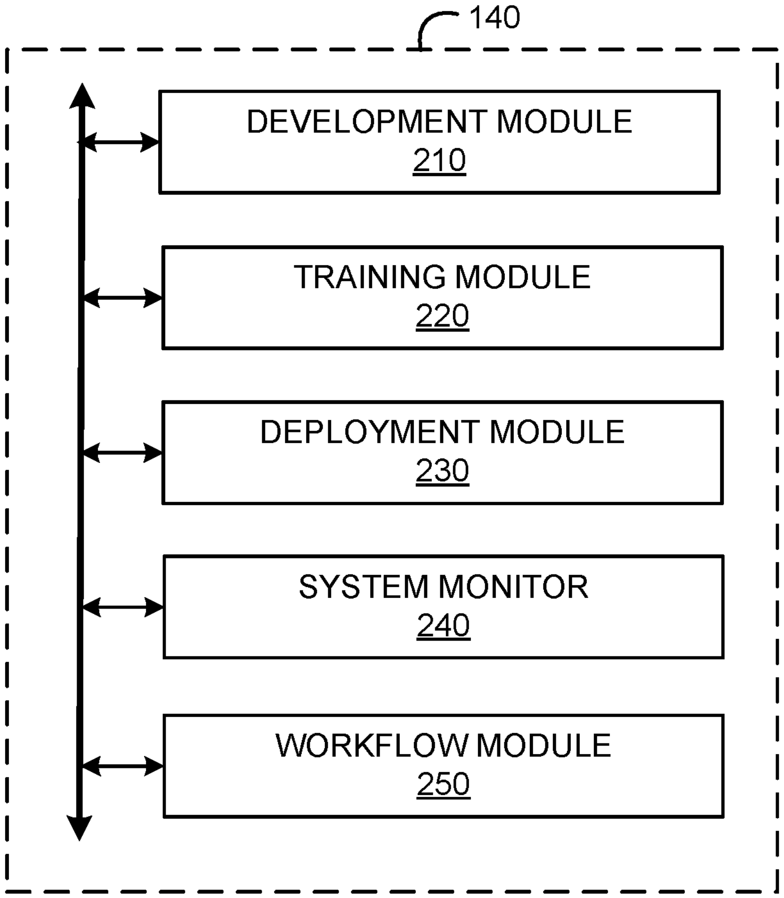
FIG. 2 is an example block diagram showing the core management system, in accordance with some embodiment.

Turning now to FIG. 2, greater detail is provided regarding the core management system 140. The core management system 140 may include a data science development module 210, a data harmonizer workflow creation module 250, a software deployment module 230, a federated master algorithm training module 220, a system monitoring module 240, and a data store comprising global join data 240.

The data science development module 210 may be configured to receive input data requirements from the one or more algorithm developers for the optimization and/or validation of the one or more models. The input data requirements define the objective for data curation, data transformation, and data harmonization workflows. The input data requirements also provide constraints for identifying data assets acceptable for use with the one or more models. The data harmonizer workflow creation module 250 may be configured to manage transformation, harmonization, and annotation protocol development and deployment. The software deployment module 230 may be configured along with the data science development module 210 and the data harmonizer workflow creation module 250 to assess data assets for use with one or more models. This process can be automated or can be an interactive search/query process. The software deployment module 230 may be further configured along with the data science development module 210 to integrate the models into a sequestered capsule computing framework, along with required libraries and resources.

In some embodiments, it is desired to develop a robust, superior algorithm/model that has learned from multiple disjoint private data sets (e.g., clinical and health data) collected by data hosts from sources (e.g., patients). The federated master algorithm training module may be configured to aggregate the learning from the disjoint data sets into a single master algorithm. In different embodiments, the algorithmic methodology for the federated training may be different. For example, sharing of model parameters, ensemble learning, parent-teacher learning on shared data and many other methods may be developed to allow for federated training. The privacy and security requirements, along with commercial considerations such as the determination of how much each data system might be paid for access to data, may determine which federated training methodology is used.

The system monitoring module 240 monitors activity in sequestered computing nodes. Monitored activity can range from operational tracking such as computing workload, error state, and connection status as examples to data science monitoring such as amount of data processed, algorithm convergence status, variations in data characteristics, data errors, algorithm/model performance metrics, and a host of additional metrics, as required by each use case and embodiment.

In some instances, it is desirable to augment private data sets with additional data located at the core management system (join data 150). For example, geolocation air quality data could be joined with geolocation data of patients to ascertain environmental exposures. In certain instances, join data may be transmitted to sequestered computing nodes to be joined with their proprietary datasets during data harmonization or computation.

The sequestered computing nodes may include a harmonizer workflow module, harmonized data, a runtime server, a system monitoring module, and a data management module (not shown). The transformation, harmonization, and annotation workflows managed by the data harmonizer workflow creation module may be deployed by and performed in the environment by harmonizer workflow module using transformations and harmonized data. In some instances, the join data may be transmitted to the harmonizer workflow module to be joined with data during data harmonization. The runtime server may be configured to run the private data sets through the algorithm/model.

The system monitoring module monitors activity in the sequestered computing node. Monitored activity may include operational tracking such as algorithm/model intake, workflow configuration, and data host onboarding, as required by each use case and embodiment. The data management module may be configured to import data assets such as private data sets while maintaining the data assets within the pre-exiting infrastructure of the data stewards.

Figure 3:
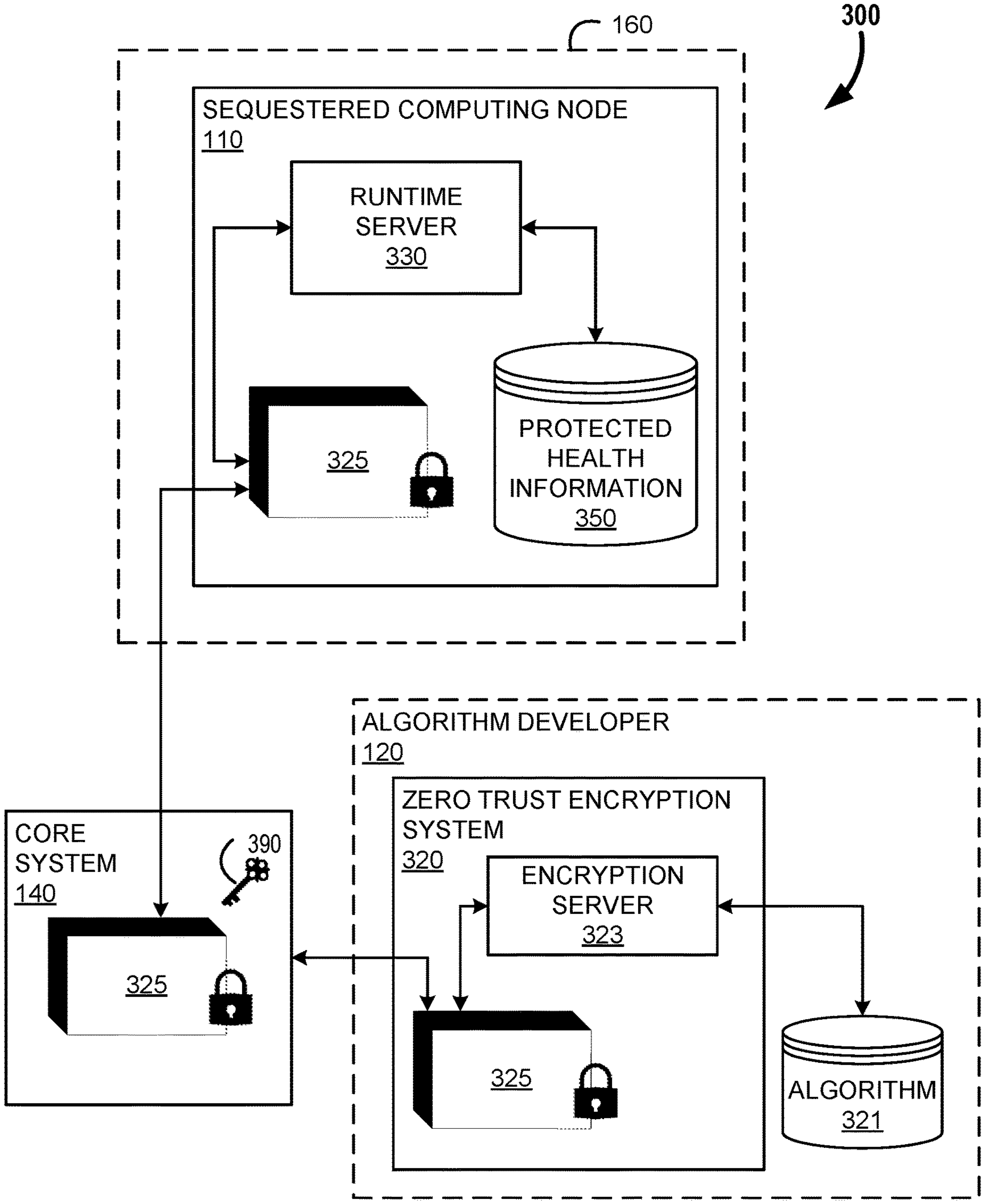
FIG. 3 is an example block diagram showing a first model for the zero-trust data flow, in accordance with some embodiment.

Turning now to FIG. 3, a first model of the flow of algorithms and data are provided, generally at 300. The Zero-Trust Encryption System 320 manages the encryption, by an encryption server 323, of all the algorithm developer's 120 software assets 321 in such a way as to prevent exposure of intellectual property (including source or object code) to any outside party, including the entity running the core management system 140 and any affiliates, during storage, transmission and runtime of said encrypted algorithms 325. In this embodiment, the algorithm developer is responsible for encrypting the entire payload 325 of the software using its own encryption keys. Decryption is only ever allowed at runtime in a sequestered capsule computing environment 110.

The core management system 140 receives the encrypted computing assets (algorithms) 325 from the algorithm developer 120. Decryption keys to these assets are not made available to the core management system 140 so that sensitive materials are never visible to it. The core management system 140 distributes these assets 325 to a multitude of data steward nodes 160 where they can be processed further, in combination with private datasets, such as protected health information (PHI) 350.

Each Data Steward Node 160 maintains a sequestered computing node 110 that is responsible for allowing the algorithm developer's encrypted software assets 325 to compute on a local private dataset 350 that is initially encrypted. Within data steward node 160, one or more local private datasets (not illustrated) is harmonized, transformed, and/or annotated and then this dataset is encrypted by the data steward, into a local dataset 350, for use inside the sequestered computing node 110.

The sequestered computing node 110 receives the encrypted software assets 325 and encrypted data steward dataset(s) 350 and manages their decryption in a way that prevents visibility to any data or code at runtime at the runtime server 330. In different embodiments this can be performed using a variety of secure computing enclave technologies, including but not limited to hardware-based and software-based isolation.

In this present embodiment, the entire algorithm developer software asset payload 325 is encrypted in a way that it can only be decrypted in an approved sequestered computing enclave/node 110. This approach works for sequestered enclave technologies that do not require modification of source code or runtime environments in order to secure the computing space (e.g., software-based secure computing enclaves).

Figure 4:
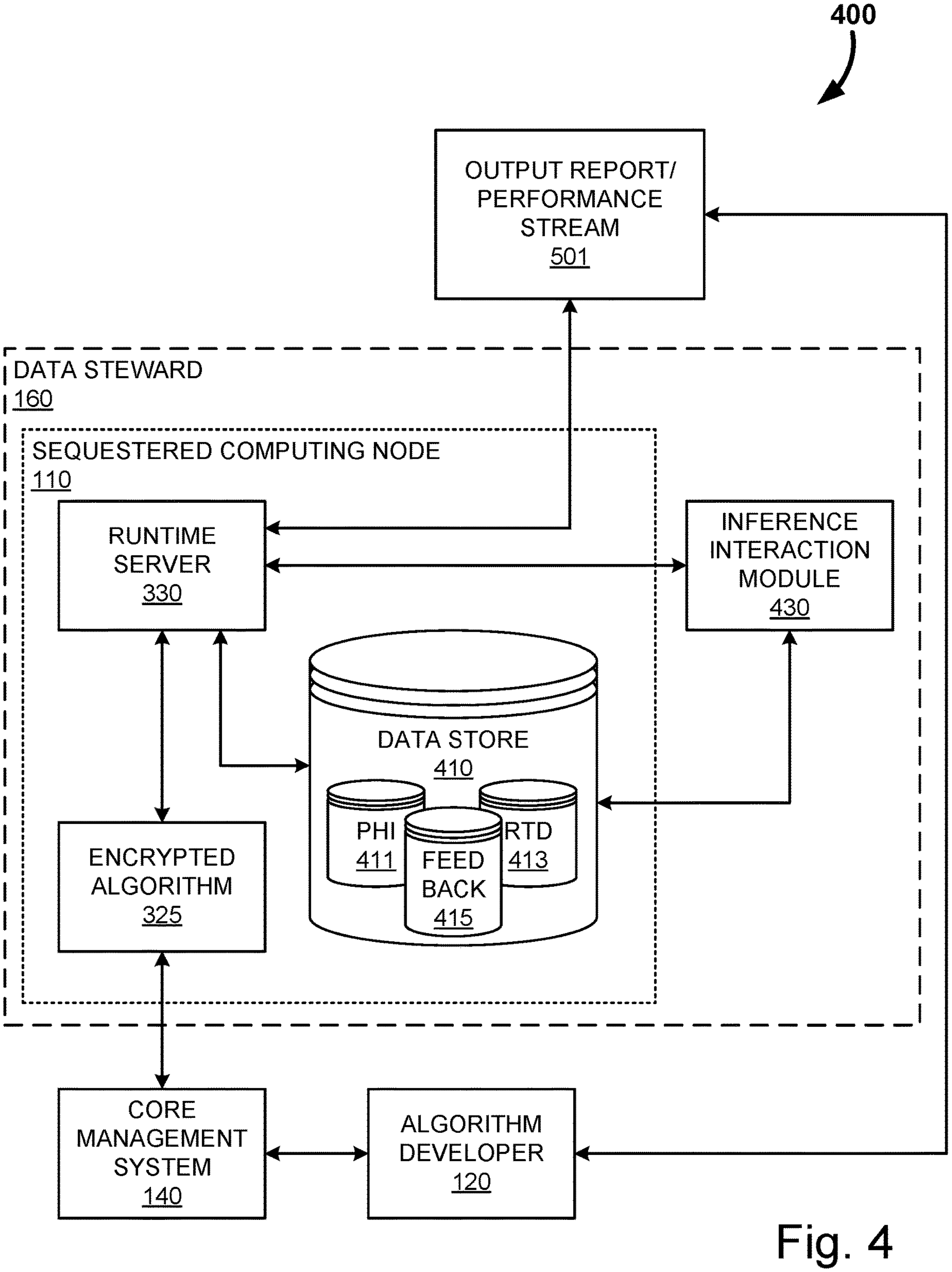
FIG. 4 is an example block diagram showing a second model for the zero-trust data flow with federated feedback, in accordance with some embodiment.

Turning to FIG. 4, the general environment is maintained, as seen generally at 400, however in this embodiment, the data store 410 includes not only the PHI database 411, but also information related to feedback 415 and real time data 413. These databases are made available to an inference interaction module 430, which also receives inferences generated by the execution of the encrypted algorithm 325 by the runtime server 330 within the sequestered computing node 110. The data and inferences may be decrypted prior to processing by the inference interaction module 430, which operates in the clear within the data steward's 160 environment.

In addition to the inference interaction module 430 receiving information from the runtime server 330, an output report and/or a stream of data related to performance 501 is output. This performance related data may be made available to the algorithm developer 120 for the validation, training and analysis of algorithm performance. Importantly, this also enables the algorithm developer to provide commands regarding algorithm operation that is responsive to the in-situ algorithm functioning. For example, the algorithm developer may provide feedback with control signals such as "stop", "re-train", "increase, decrease or change samplings". These commands are provided back to the runtime server (either directly from the algorithm developer, or more commonly through the core management system 140). In response, the runtime server 330 alters its operations with the algorithm 325 in the designated manner. This may increase model accuracy, speed, and/or breadth of functionality.

In addition to providing the performance related data 501 to the algorithm developer 120, this data may be consumed by other third parties. For example, other data stewards may find this performance data useful for benchmarking, validation, or for when evaluating the algorithm. Importantly, regulators may utilize the performance data 501 to validate that the algorithm is operating as expected, and within the guidelines set forth by the regulatory entity. For example, the FDA has very strict controls over medical assays and analytical tools. In order for an algorithm to be leveraged in a regulated environment, particularly an algorithm that is ML based and therefore in a constant state of flux as it is tuned, it must meet criteria set forth by a regulatory body. For example, in healthcare, the FDA would define and enforce the criteria for use of certain algorithms in a clinical setting. In order to continue using such an algorithm, which is changing over time, it must be shown that the algorithm is continuing to operate within the designated parameters. The performance data 501 allows the regulatory body (e.g., FDA) to validate that the algorithm is in compliance. This system may also be employed to generate alerts to regulators, data stewards or algorithm developers when specific criteria have been met. Such criteria could be minimum number of inferences generated, error rates exceeding a threshold, or any other metric that can be computed as new inferences are made.

Within the sequestered computing node 110, or within the datastore 410, an algorithm deployment, interaction and improvement package may be deployed. This package includes the algorithm, the data annotation spec, tooling for performing annotation (when appropriate), the validation report spec, and a store of specific dataframes, inferences and user feedback. This package may be leveraged by the inference interaction module 430 to collect "gold standard" training labels at any time during algorithm deployment. This feedback may be stored 415 for future algorithm training and for compiling performance data/output reports. In some embodiments, all dataframes and their associated inferences may be stored, regardless of if there is an annotation label or not. Having access to these old dataframe/inference pairs enabled later algorithm validation by comparing new algorithm inferences given the associated dataframe, versus the original algorithm inference.

In some embodiments, the sequestered computing node 110 may deploy intelligence around which data that has been collected to keep. This intelligence may include ML algorithms that are tasked with identifying events or perturbations within the underlying data. In other embodiments, this intelligence may to use standard operational controls like control charts, or performance set points like deviation beyond an expected amount. For example, predicted sensitivity is 0.85+/−0.03 (1 SD), then it may be flagged when average performance falls below 0.77 or −2.56 SD (1% two sided). Other checks could flag significant differences by age, race, or geographic location. The selection of which data to keep may be determined by a statistical sampling approach, which could be designed to select an unbiased sample or in some applications, may bias the collected data for specific characteristics.

Figure 5A:
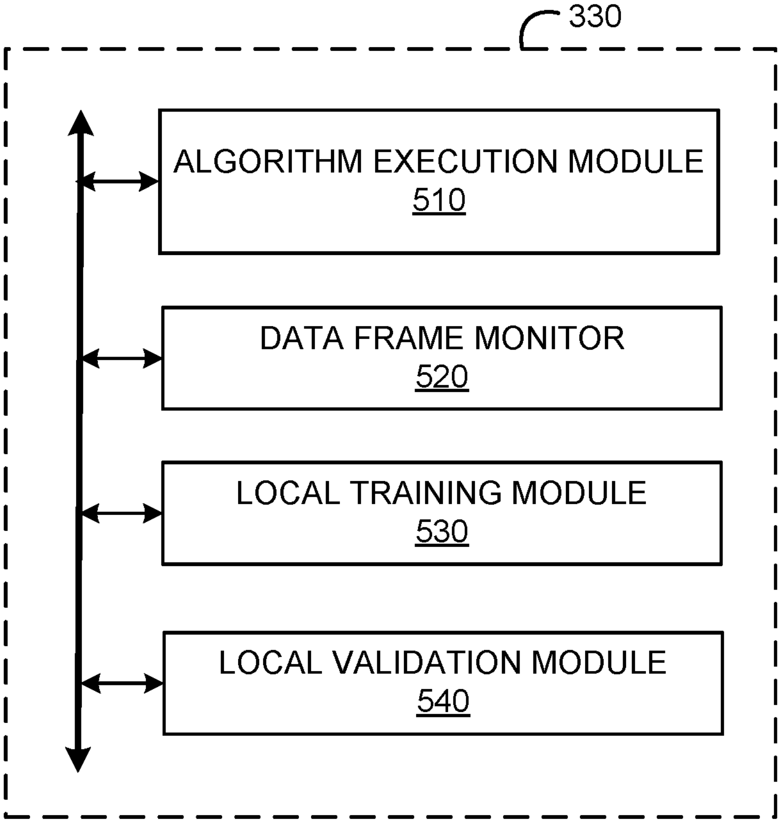
FIG. 5A is an example block diagram showing a runtime server, in accordance with some embodiment.

The runtime server 330 executes the algorithm 325, as described herein. However, the runtime server 330 may perform additional operations that are important for the federated feedback. FIG. 5A provides a more detailed illustration of the functional components of the runtime server 330. An algorithm execution module 510 performs the actual processing of the protected data (e.g., PHI) 411 using the algorithm 325. The result of this execution includes the generation of discrete inferences. Additionally, the runtime sever can monitor incoming dataframes at a dataframe monitor 520. In a deployed state, the dataframes come from the data steward, specifically from an health records database or a medical device (e.g. MRI or x-ray) or other database. These monitored dataframes may inform opportunities to improve algorithm performance and/or the addition of additional capabilities to a given algorithm One example may be: The Algorithm Developer has identified potential new data elements that could improve performance, but the number of records in the original training set was not large enough to justify inclusion of this data (the data element did not pass false discover checks). The unused data could be collected nonetheless, and an alternate model run contemporaneously with the deployed model, and compared to determine if the marginal data element resulted in improved performance. Similarly, a greater number of alternative data elements may be collected and checked for applicability to the algorithm using various means.

An algorithm improvement in this context could include a change in algorithm type (e.g. decision tree replaced by boosted decision tree algorithm) or a change in how the incoming dataframe is processed in the algorithm computation. For example, the monitor may determine if there are partitions that have greater signal to noise ratios. Likewise, the monitor 520 can determine if there are systemic biases from location to location. This may be determined by running a hypothesis test between locations to check for statistically significant performance differences. Flagrant differences would be highlighted, and then the patient population general demographics or data element differences at the population level could be checked for significance. Urban vs. exurban populations could have underlying conditions being picked up by the algorithm causing bias, that must be controlled for through the inclusion of additional data elements (e.g. adding HbA1c level or a dummy variable to account for diabetes in a model looking at dementia). More noise will degrade the model performance across sites, while bias will show significant differences between sites (note that some sites may perform better than the mean model predicted, while others will perform worse).

The runtime server 330 utilizing the dataframe monitor 520 likewise correlates differences in algorithm performance to differences in underlying population characteristics. This correlation may leverage clustering algorithms which identify attributes in the population being analyzed, and comparing these attributes to algorithm performance. In some embodiments, the underlying data may be segregated into splits, and algorithm performance is measured for each data split. The differences in the performance for a split versus another split are leveraged to determine which underlying attributes are impacting the algorithm operation. “Splits” is generally a term used for cross validation, in which the data set is divided into some number (e.g., 2, 4, 5, 10) of subsets or splits. The model is then trained against a large subset (say 4 of 5 splits in a 5× cross validation), and then “validated” against the remaining 1 split. In this context it may be preferred to use “leave one out” meaning one data element is left out and the remaining retrained, to see if there is significant difference. In some embodiments, splits can refer to other methods for defining subsets of the training data, for example by creating training, test and validation subsets.

In some embodiments, the runtime server 330 may additionally execute a master algorithm, and tune the algorithm locally at a local training module 530. Such localized training is known, However, in the present system, the local training module 530 is configured to take the locally tuned model and then reoptimize the master. For example, it is possible to determine the source of population difference in the locally tuned algorithm to inform a new data element in the master algorithm that would automatically account for the local bias, and hence could be applied uniformly instead of locally (saving money).

In other embodiments, the master algorithm would be re-optimized using a federated training methodology, using some or all of the federated feedback data. The new reoptimized master may, in a reliable manner, be retuned to achieve performance that is better than the prior model's performance, yet staying consistent with the prior model. In general, there are “unknown unknowns” in the model, and one way to identify them is to deploy locally and compare differences for clues. In this sense the local deployments allow for data discovery that didn't exist in the original data, mainly because the population distribution was limited (bias condition did not exist) or the number of patients was limited (bias condition existed but not in numbers that were significant). Increasing N increases the significance of small differences, and allows for identification of new reasons for differences (new data elements).

In some embodiments, the confirmation that a retuned model is performing better than the prior version is determined by a local validation module 540. The local validation module 540 may include a mechanical test whereby the algorithm is deployed with a model specific validation methodology that is capable of determining that the algorithm performance has not deteriorated after a re-optimization. In some embodiments, the tuning may be performed on different data splits, and these splits are used to define a redeployment method. In one embodiment, a split or subset of the labeled data (including in some cases labeled data from a master training set) is considered to be an “anchoring set” which would have a substantially higher weight in the assessment of total prediction error than the average labeled data point. In some embodiments, this weighting may be set high enough that no retuned model that incorrectly predicts values for the anchoring set may be deployed. That is, these labeled anchoring set datapoints are so important that no model update may change the prediction of the algorithm for them.

There are numerous possible methods to determine an anchor set. One example would be to apply data distillation techniques to create a minimum training set that captures the salient features of the model. The resulting set could be used as an anchoring set, or a highly performing subset of these points could be selected. For example, in a binary classification algorithm, only true positives and true negatives could be selected as the anchoring set. Any future retuned model would be required to continue to correctly predict these points. It should be noted that increasing the number (N) of samplings used for optimization not only improves the model's performance, but also reduces the size of the confidence interval.

As new data points are labeled, the performance of the algorithm can be updated and reported back to the algorithm developer. These data can be further combined with data about each deployment to allow comparison of algorithm performance over time across a variety of deployment characteristics. For example, changes in performance of the algorithm over time could be aggregated regionally, to identify geographical trends in care that might impact algorithm performance. Alternatively, data might be aggregated by device manufacturer, clinical context, view (in the case of some imaging modalities) and useful inferences about factors impacting long-term performance of the algorithm can be made.

In some embodiments, additional demographic or clinical data may be included in data steward datasets (data fields which are not strictly in the algo developer's data specification) which could be used by algorithms developers (potentially facilitated by the core management system) to further analyze algorithm performance and potentially identify areas of likely improvement to algorithms. For example, separate performance reports for different subsets of each data steward dataset based on these additional data could be generated and used to indicate where additional input data could be beneficial to algorithm performance.

Figure 5B:
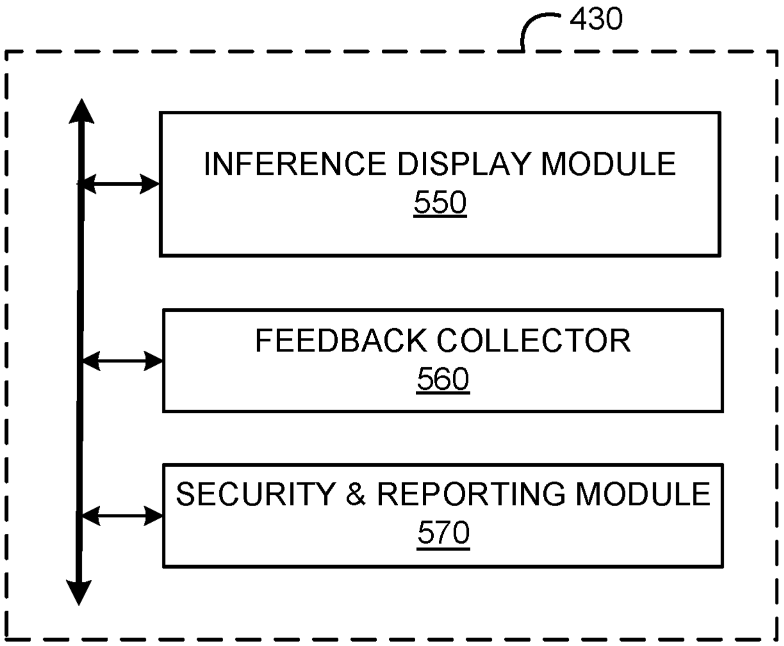
FIG. 5B is an example block diagram showing an inference interaction module, in accordance with some embodiment.

The inference interaction module 430 is shown in greater detail in relation to FIG. 5B. The inference interaction module 430, as previously discussed, may operate in the clear within the data steward's environment. As such, the inference interface module 430 has access to PHI 411, feedback data 415 and the real time data streams 413, as well as additional data that may be contained within the data store 410. The inference interface module 430 likewise consumes inferences supplied by the runtime server 330. However, as the inference interaction module 430 operates outside of the sequestered computing node 110, it does not have access to the algorithm that generates these inferences.

The inference interaction module 430 includes three subcomponents: the first being an inference display module 550. This enables individuals in the data steward's environment consume the inferences directly. The inference display module 550 takes the native formatted inferences and converts them into a format consistent with the data steward's workflow. In some embodiments this may be delivered through an application programming interface (API), and in others may be a direct integration with other information systems. For example, such as with an electronic health record (EHR) or business intelligence (BI) dashboard. Decryption of the inference information before being handles by the inference interaction module 430 may be performed by the secure computing node 110 directly, either inference and the reference ID, or the inference and data decrypted and pushed to the inference interaction module 430 from the runtime server 330.

The inference interaction module 430 also comprises a feedback collector 560. This module collects feedbacks to the inferences from one or more data steward users regarding accuracy or utility of the inference. The decision to collect feedback for each dataframe event (the data event that triggers an inference) may be collected using a number of mechanisms. For example, a user may be provided every result and the feedback may be required. Such a method is the most inclusive, and results in the best ability to improve model functioning. However, it is also extremely labor intensive, and may require too much user resources to be effectively deployed. Instead randomly selected samples may be selected for review by the users. In some embodiments, annotation tooling and an annotation specification are deployed along with the algorithm by the algorithm developer. In these embodiments, the tooling and specification may be provided in a separate container than the model itself, thereby allowing the data steward 160 to have access to the tooling and specification outside of the secure computing node 110.

Additionally, in some other embodiments, pseudorandom selection of dataframe events may be employed for user annotation. Active learning methodologies may select dataframes that are most likely to be highly informative to the model. There are a number of active learning strategies that could be applied for this application, all of which are intended to create an optimal balance between exploring new regions of the input data space, and using existing information to select informative data from previously explored regions of the space. The "value" of a new data point can be computed in a number of ways. Some of the more common methods are to select input dataframes for which the confidence of the algorithm in its prediction is low, to select points that are most likely to change the model parameters, to select data points nearest decision boundaries (for classifiers), to select data points that give different results for different versions of models, to select dataframes that are "furthest" from other labeled data points (the concept of "furthest" can be defined by any metric defined on the input space), and many others. The core method is to preferentially select additional labeling data points that satisfy one of the above criteria in order to learn the maximum amount from each labeling exercise. This allows cases that have low probability, from a characteristics perspective, to be presented in a "training profile".

The inference interaction module 430 also comprises a reporting module 570 which reports feedback 415 to the data store 410. The feedback reporting links the event dataframe, the inference, and details of the feedback (including some combination of an agree/disagree with the inference, reason for the disagreement and correct answer, etc.) together. This data is then archived within the data store 410 after being encrypted by the secure computing node 110). This feedback may be leveraged by the runtime server 330 for the localized tuning of models (as previously discussed), as well as a metric for algorithm performance. In some embodiments, the original data and the annotation data may be kept separately, and may only be combined with the appropriate key. This key could include a timestamp, medical record number (MRN) or other hashed ID, device ID, location ID, or the like. This validation data is guaranteed to never have been seen by the algorithm developer 120, making it ideal evidence for a regulatory body when they are verifying the algorithm still meets regulatory criteria. It should be noted that because the algorithm will be deployed into many local environments, each with its own sequestered computing node 110, the union of these locally collected feedback packages can be used to perform federated training of the algorithm, and/or it can be used to tune an algorithm for improved performance at each site.

Figure 6:
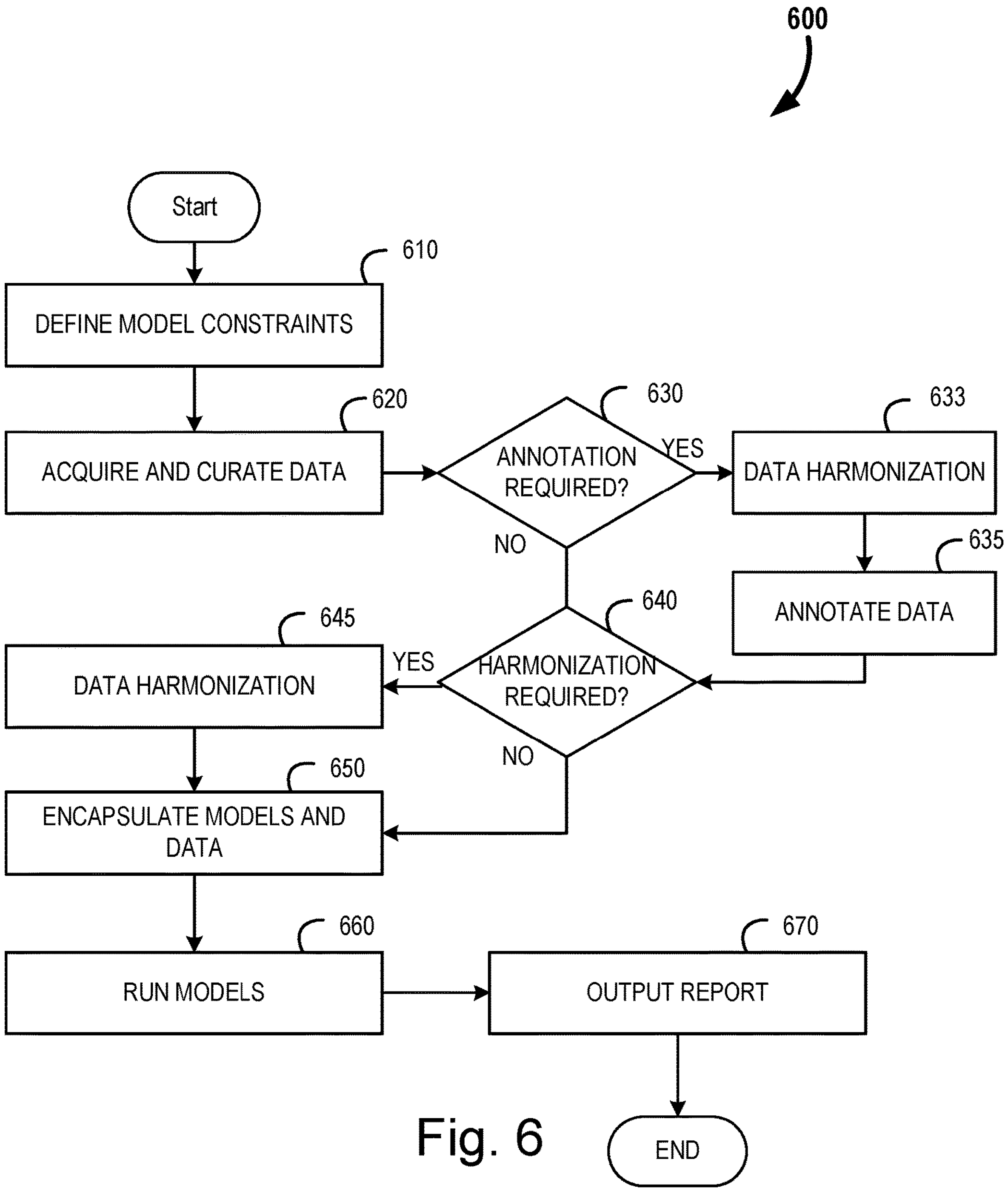
FIG. 6 is a flowchart for an example process for the operation of the zero-trust data processing system, in accordance with some embodiment.

Turning to FIG. 6, one embodiment of the process for deployment and running of algorithms within the sequestered computing nodes is illustrated, at 600. Initially the algorithm developer provides the algorithm to the system. The at least one algorithm/model is generated by the algorithm developer using their own development environment, tools, and seed data sets (e.g., training/testing data sets). In some embodiments, the algorithms may be trained on external datasets instead, as will be discussed further below. The algorithm developer provides constraints (at 610) for the optimization and/or validation of the algorithm(s). Constraints may include any of the following: (i) training constraints, (ii) data preparation constraints, and (iii) validation constraints. These constraints define objectives for the optimization and/or validation of the algorithm(s) including data preparation (e.g., data curation, data transformation, data harmonization, and data annotation), model training, model validation, and reporting.

In some embodiments, the training constraints may include, but are not limited to, at least one of the following: hyperparameters, regularization criteria, convergence criteria, algorithm termination criteria, training/validation/test data splits defined for use in algorithm(s), and training/testing report requirements. A model hyper parameter is a configuration that is external to the model, and which value cannot be estimated from data. The hyperparameters are settings that may be tuned or optimized to control the behavior of a ML or AI algorithm and help estimate or learn model parameters.

Regularization constrains the coefficient estimates towards zero. This discourages the learning of a more complex model in order to avoid the risk of overfitting. Regularization, significantly reduces the variance of the model, without a substantial increase in its bias. The convergence criterion is used to verify the convergence of a sequence (e.g., the convergence of one or more weights after a number of iterations). The algorithm termination criteria define parameters to determine whether a model has achieved sufficient training. Because algorithm training is an iterative optimization process, the training algorithm may perform the following steps multiple times. In general, termination criteria may include performance objectives for the algorithm, typically defined as a minimum amount of performance improvement per iteration or set of iterations.

The training/testing report may include criteria that the algorithm developer has an interest in observing from the training, optimization, and/or testing of the one or more models. In some instances, the constraints for the metrics and criteria are selected to illustrate the performance of the models. For example, the metrics and criteria such as mean percentage error may provide information on bias, variance, and other errors that may occur when finalizing a model such as vanishing or exploding gradients. Bias is an error in the learning algorithm. When there is high bias, the learning algorithm is unable to learn relevant details in the data. Variance is an error in the learning algorithm, when the learning algorithm tries to over-learn from the dataset or tries to fit the training data as closely as possible. Further, common error metrics such as mean percentage error and R2 score are not always indicative of accuracy of a model, and thus the algorithm developer may want to define additional metrics and criteria for a more in depth look at accuracy of the model.

Figure 7A:
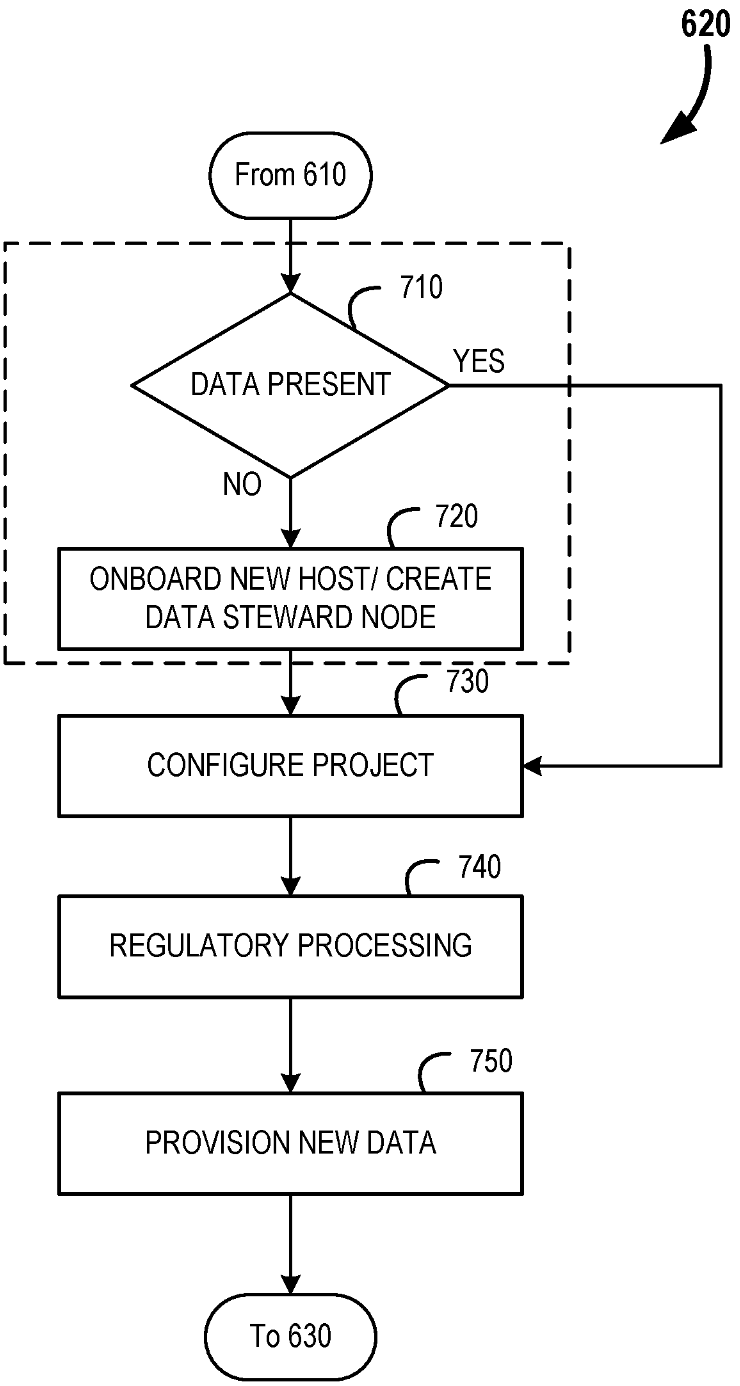
FIG. 7A a flowchart for an example process of acquiring and curating data, in accordance with some embodiment.

Next, data assets that will be subjected to the algorithm(s) are identified, acquired, and curated (at 620). FIG. 7A provides greater detail of this acquisition and curation of the data. Often, the data may include healthcare related data (PHI). Initially, there is a query if data is present (at 710). The identification process may be performed automatically by the platform running the queries for data assets (e.g., running queries on the provisioned data stores using the data indices) using the input data requirements as the search terms and/or filters. Alternatively, this process may be performed using an interactive process, for example, the algorithm developer may provide search terms and/or filters to the platform. The platform may formulate questions to obtain additional information, the algorithm developer may provide the additional information, and the platform may run queries for the data assets (e.g., running queries on databases of the one or more data hosts or web crawling to identify data hosts that may have data assets) using the search terms, filters, and/or additional information. In either instance, the identifying is performed using differential privacy for sharing information within the data assets by describing patterns of groups within the data assets while withholding private information about individuals in the data assets.

Figure 7B:
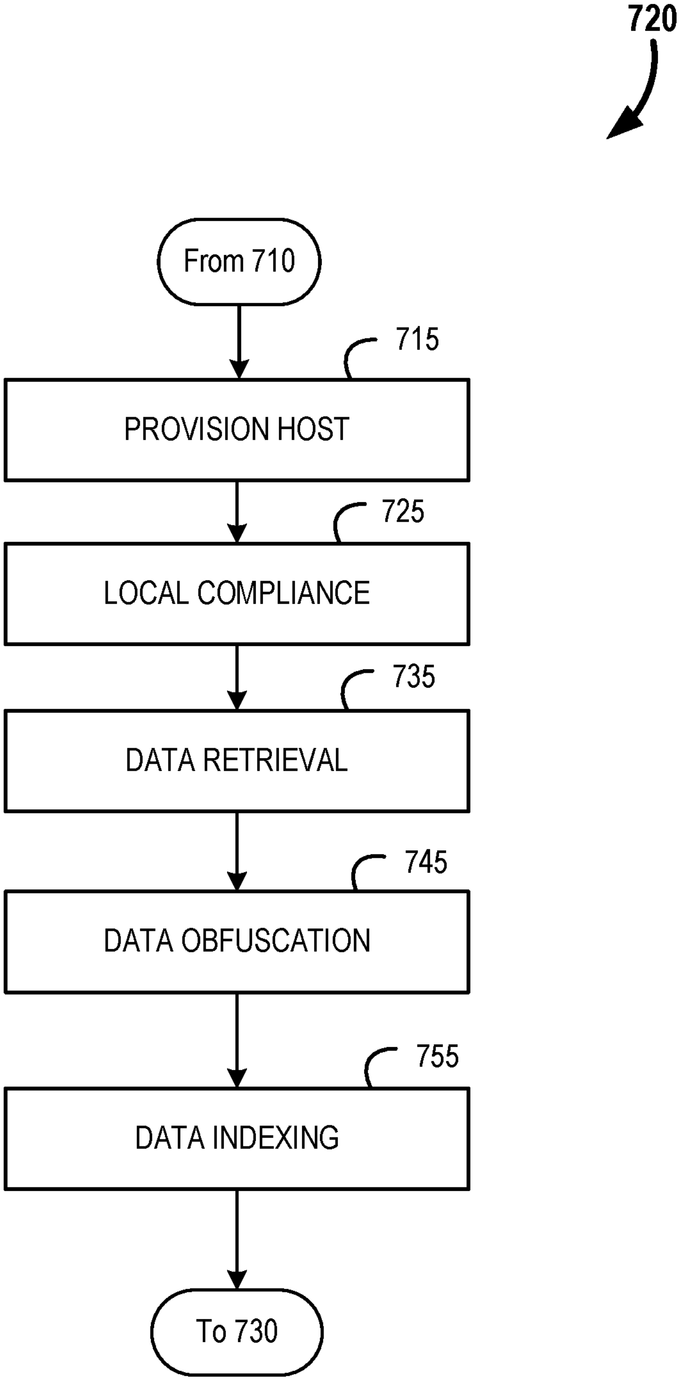
FIG. 7B a flowchart for an example process of onboarding a new host data steward, in accordance with some embodiment.

If the assets are not available, the process generates a new data steward node (at 720). The data query and onboarding activity (surrounded by a dotted line) is illustrated in this process flow of acquiring the data; however, it should be realized that these steps may be performed any time prior to model and data encapsulation (step 650 in FIG. 6). Onboarding/creation of a new data steward node is shown in greater detail in relation to FIG. 7B. In this example process a data host compute and storage infrastructure (e.g., a sequestered computing node as described with respect to FIGS. 1A-5) is provisioned (at 715) within the infrastructure of the data steward. In some instances, the provisioning includes deployment of encapsulated algorithms in the infrastructure, deployment of a physical computing device with appropriately provisioned hardware and software in the infrastructure, deployment of storage (physical data stores or cloud-based storage), or deployment on public or private cloud infrastructure accessible via the infrastructure, etc.

Next, governance and compliance requirements are performed (at 725). In some instances, the governance and compliance requirements includes getting clearance from an institutional review board, and/or review and approval of compliance of any project being performed by the platform and/or the platform itself under governing law such as the Health Insurance Portability and Accountability Act (HIPAA). Subsequently, the data assets that the data steward desires to be made available for optimization and/or validation of algorithm(s) are retrieved (at 735). In some instances, the data assets may be transferred from existing storage locations and formats to provisioned storage (physical data stores or cloud-based storage) for use by the sequestered computing node (curated into one or more data stores). The data assets may then be obfuscated (at 745). Data obfuscation is a process that includes data encryption or tokenization, as discussed in much greater detail below. Lastly, the data assets may be indexed (at 755). Data indexing allows queries to retrieve data from a database in an efficient manner. The indexes may be related to specific tables and may be comprised of one or more keys or values to be looked up in the index (e.g., the keys may be based on a data table's columns or rows).

Returning to FIG. 7A, after the creation of the new data steward, the project may be configured (at 730). In some instances, the data steward computer and storage infrastructure is configured to handle a new project with the identified data assets. In some instances, the configuration is performed similarly to the process described of FIG. 7B. Next, regulatory approvals (e.g., IRB and other data governance processes) are completed and documented (at 740). Lastly, the new data is provisioned (at 750). In some instances, the data storage provisioning includes identification and provisioning of a new logical data storage location, along with creation of an appropriate data storage and query structure.

Returning now to FIG. 6, after the data is acquired and configured, a query is performed if there is a need for data annotation (at 630). If so, the data is initially harmonized (at 633) and then annotated (at 635). Data harmonization is the process of collecting data sets of differing file formats, naming conventions, and columns, and transforming it into a cohesive data set. The annotation is performed by the data steward in the sequestered computing node. A key principle to the transformation and annotation processes is that the platform facilitates a variety of processes to apply and refine data cleaning and transformation algorithms, while preserving the privacy of the data assets, all without requiring data to be moved outside of the technical purview of the data steward.

Figure 8:
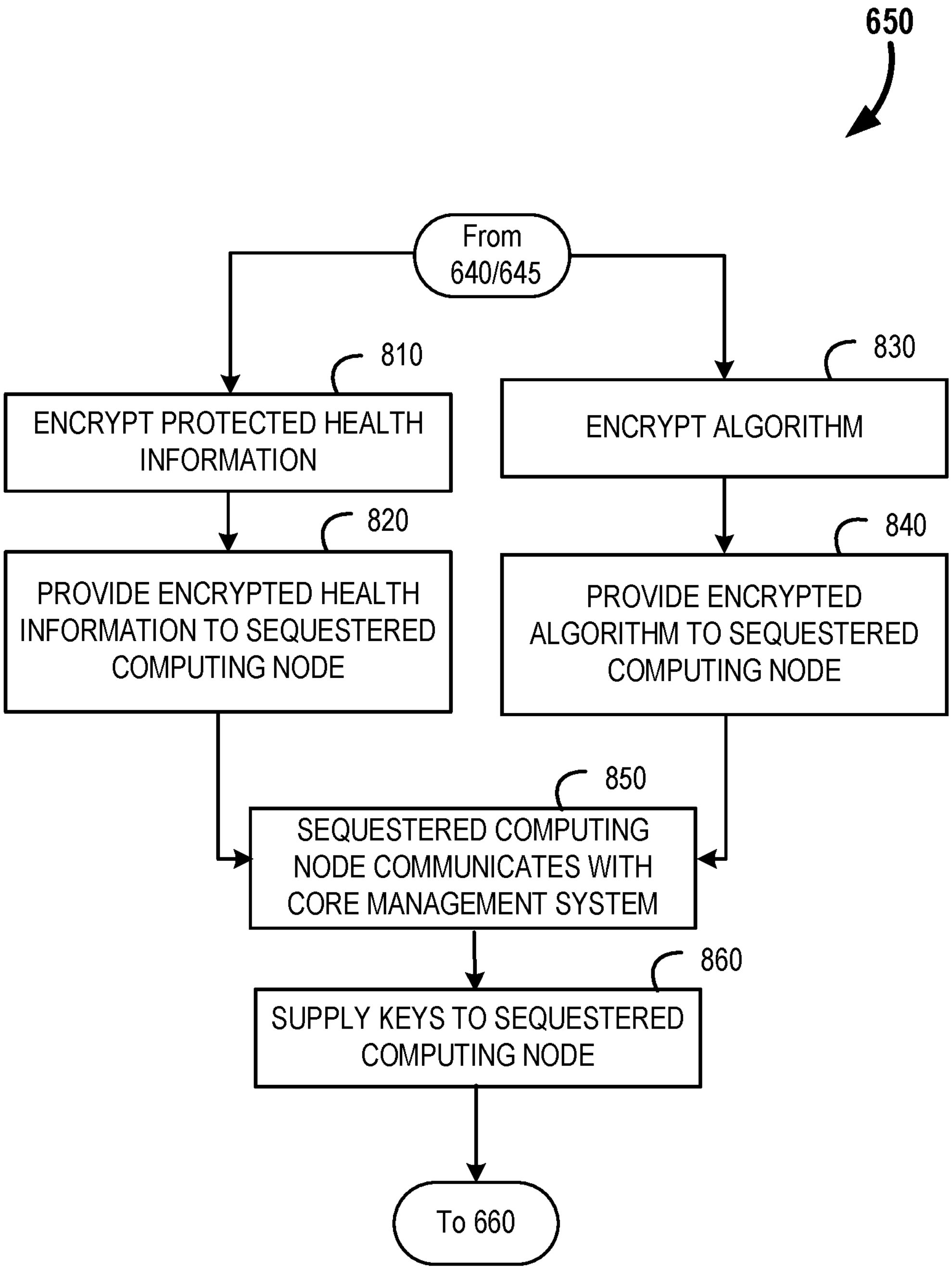
FIG. 8 is a flowchart for an example process of encapsulating the algorithm and data, in accordance with some embodiment.

After annotation, or if annotation was not required, another query determines if additional data harmonization is needed (at 640). If so, then there is another harmonization step (at 645) that occurs in a manner similar to that disclosed above. After harmonization, or if harmonization isn't needed, the models and data are encapsulated (at 650). Data and model encapsulation is described in greater detail in relation to FIG. 8. In the encapsulation process the protected data, and the algorithm are each encrypted (at 810 and 830 respectively). In some embodiments, the data is encrypted either using traditional encryption algorithms (e.g., RSA) or homomorphic encryption.

Next the encrypted data and encrypted algorithm are provided to the sequestered computing node (at 820 and 840 respectively). There processes of encryption and providing the encrypted payloads to the sequestered computing nodes may be performed asynchronously, or in parallel. Subsequently, the sequestered computing node may phone home to the core management node (at 850) requesting the keys needed. These keys are then also supplied to the sequestered computing node (at 860), thereby allowing the decryption of the assets.

Returning again to FIG. 6, once the assets are all within the sequestered computing node, they may be decrypted and the algorithm may run against the dataset (at 660). The results from such runtime may be outputted as a report (at 670) for downstream consumption.

Figure 9:
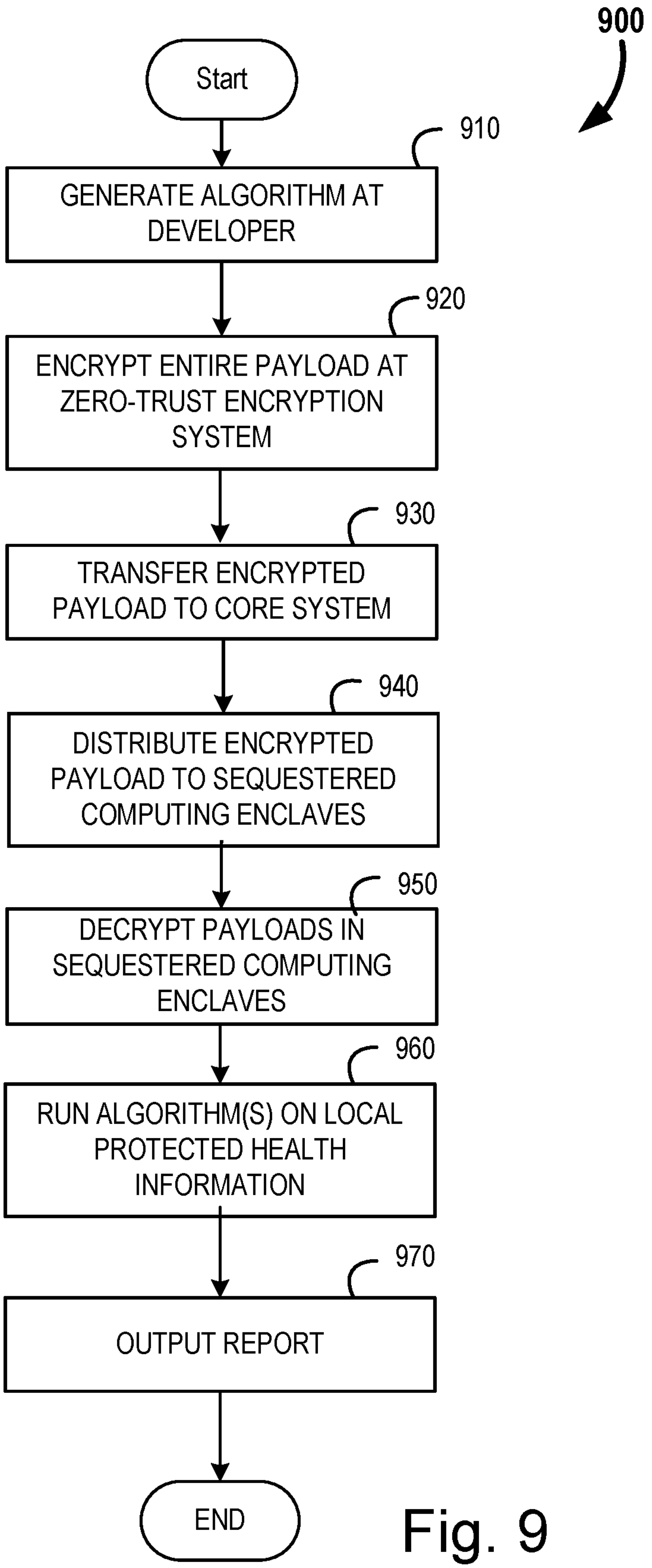
FIG. 9 is a flowchart for an example process of a first model of algorithm encryption and handling, in accordance with some embodiment.

Turning now to FIG. 9, a first embodiment of the system for zero-trust processing of the data assets by the algorithm is provided, at 900. In this example process, the algorithm is initially generated by the algorithm developer (at 910) in a manner similar to that described previously. The entire algorithm, including its container, is then encrypted (at 920), using a public key, by the encryption server within the zero-trust system of the algorithm developer's infrastructure. The entire encrypted payload is provided to the core management system (at 930). The core management system then distributes the encrypted payload to the sequestered computing enclaves (at 940).

Likewise, the data steward collects the data assets desired for processing by the algorithm. This data is also provided to the sequestered computing node. In some embodiments, this data may also be encrypted. The sequestered computing node then contacts the core management system for the keys. The system relies upon public-private key methodologies for the decryption of the algorithm, and possibly the data (at 950).

After decryption within the sequestered computing node, the algorithm(s) are run (at 960) against the protected health information (or other sensitive information based upon the given use case). The results are then output (at 970) to the appropriate downstream audience (generally the data steward, but may include public health agencies or other interested parties).

Figure 10:
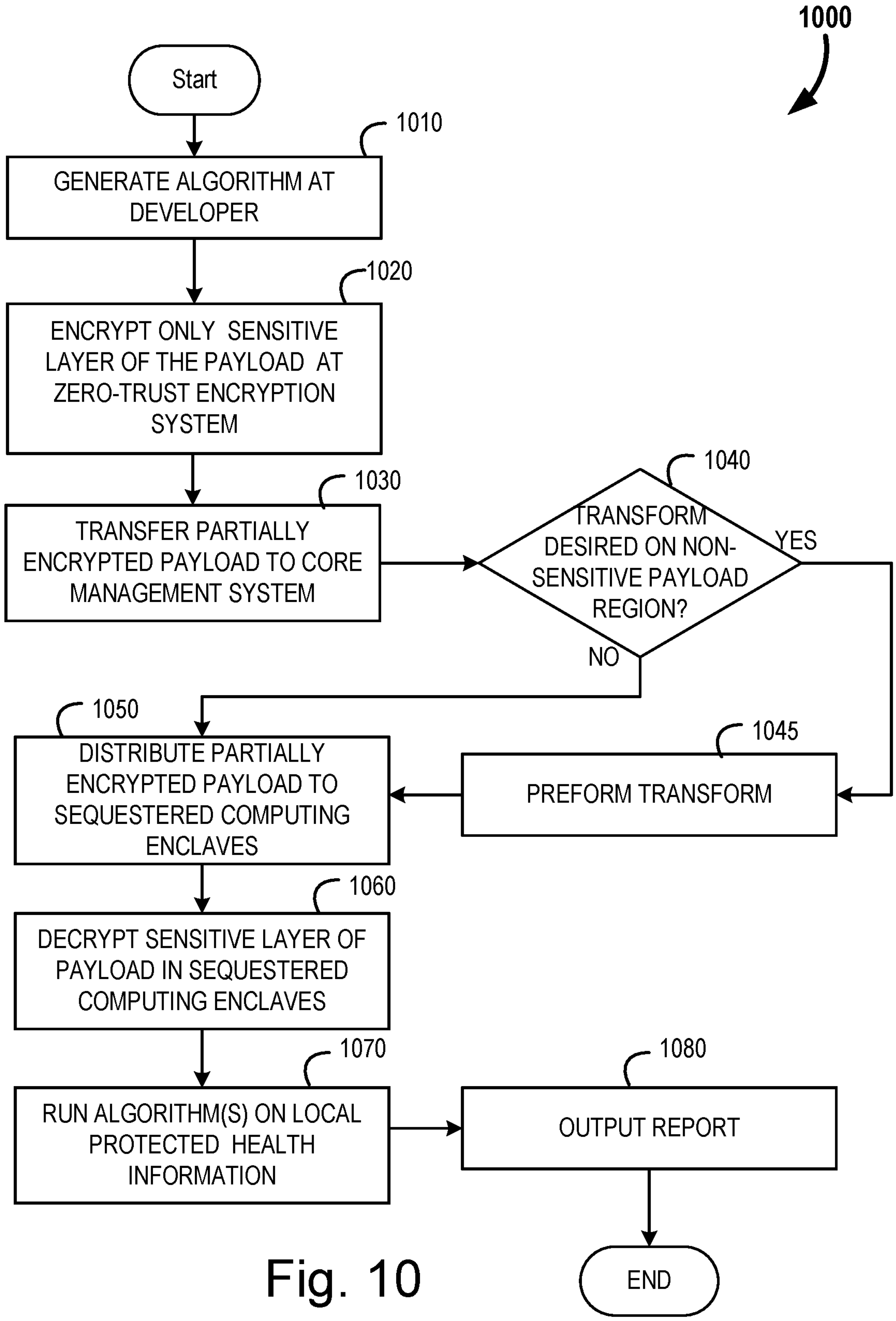
FIG. 10 is a flowchart for an example process of a second model of algorithm encryption and handling, in accordance with some embodiments.

FIG. 10, on the other hand, provides another methodology of zero-trust computation that has the advantage of allowing some transformation of the algorithm data by either the core management system or the data steward themselves, shown generally at 1000. As with the prior embodiment, the algorithm is initially generated by the algorithm developer (at 1010). However, at this point the two methodologies diverge. Rather than encrypt the entire algorithm payload, it differentiates between the sensitive portions of the algorithm (generally the algorithm weights), and non-sensitive portions of the algorithm (including the container, for example). The process then encrypts only layers of the payload that have been flagged as sensitive (at 1020).

The partially encrypted payload is then transferred to the core management system (at 1030). At this stage a determination is made whether a modification is desired to the non-sensitive, non-encrypted portion of the payload (at 1040). If a modification is desired, then it may be performed in a similar manner as discussed previously (at 1045).

If no modification is desired, or after the modification is performed, the payload may be transferred (at 1050) to the sequestered computing node located within the data steward infrastructure (or a third party). Although not illustrated, there is again an opportunity at this stage to modify any non-encrypted portions of the payload when the algorithm payload is in the data steward's possession.

Next, the keys unique to the sequestered computing node are employed to decrypt the sensitive layer of the payload (at 1060), and the algorithms are run against the locally available protected health information (at 1070). In the use case where a third party is hosting the sequestered computing node, the protected health information may be encrypted at the data steward before being transferred to the sequestered computing node at said third party. Regardless of sequestered computing node location, after runtime, the resulting report is outputted to the data steward and/or other interested party (at 1080).

Figure 11:
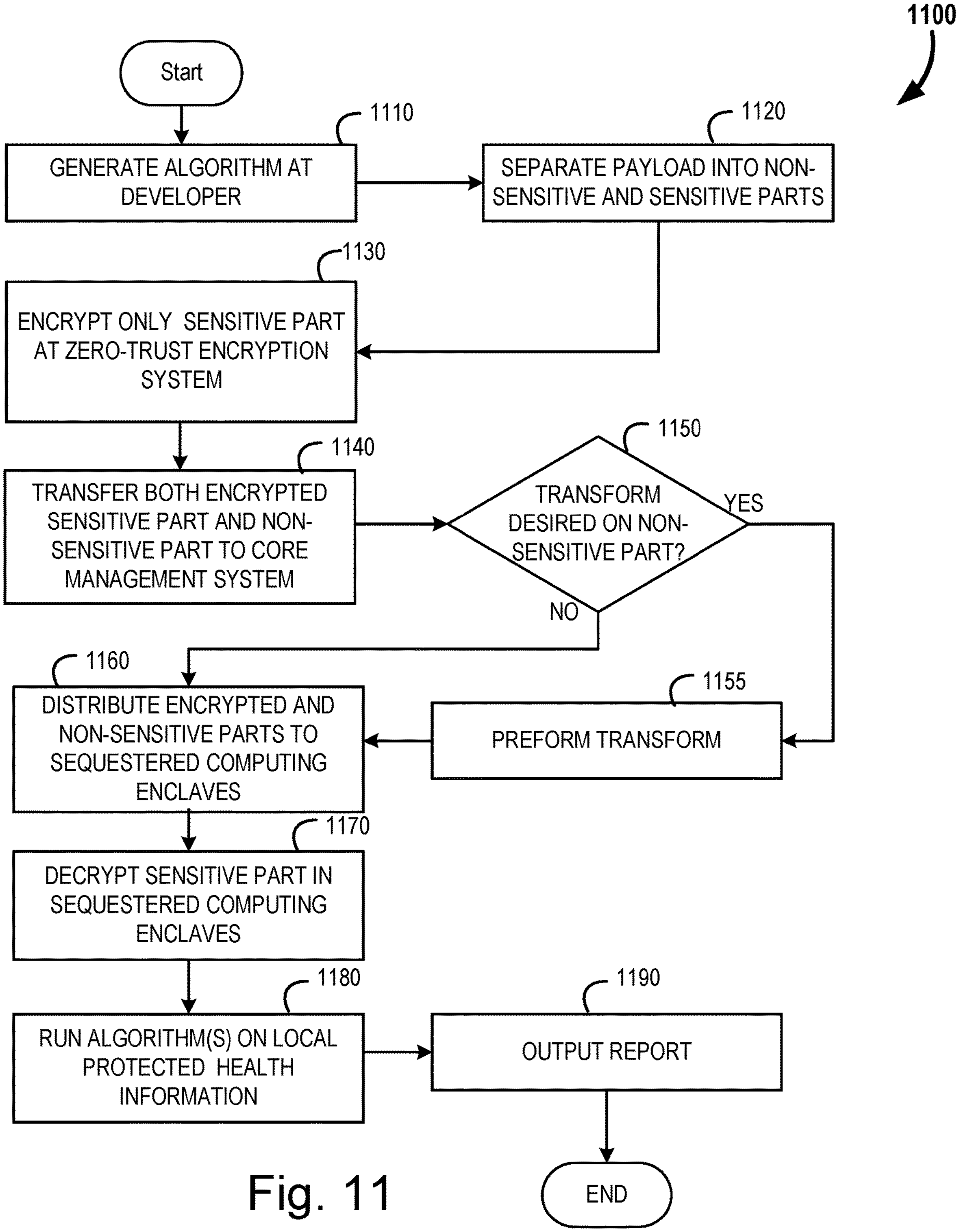
FIG. 11 is a flowchart for an example process of a third model of algorithm encryption and handling, in accordance with some embodiments.

FIG. 11, as seen at 1100, is similar to the prior two figures in many regards. The algorithm is similarly generated at the algorithm developer (at 1110); however, rather than being subject to an encryption step immediately, the algorithm payload may be logically separated into a sensitive portion and a non-sensitive portion (at 1120). To ensure that the algorithm runs properly when it is ultimately decrypted in the (sequestered) sequestered computing enclave, instructions about the order in which computation steps are carried out may be added to the unencrypted portion of the payload.

Subsequently, the sensitive portion is encrypted at the zero-trust encryption system (at 1130), leaving the non-sensitive portion in the clear. Both the encrypted portion and the non-encrypted portion of the payload are transferred to the core management system (at 1140). This transfer may be performed as a single payload, or may be done asynchronously. Again, there is an opportunity at the core management system to perform a modification of the non-sensitive portion of the payload. A query is made if such a modification is desired (at 1150), and if so it is performed (at 1155). Transformations may be similar to those detailed above.

Subsequently, the payload is provided to the sequestered computing node(s) by the core management system (at 1160). Again, as the payload enters the data steward node(s), it is possible to perform modifications to the non-encrypted portion(s). Once in the sequestered computing node, the sensitive portion is decrypted (at 1170), the entire algorithm payload is run (at 1180) against the data that has been provided to the sequestered computing node (either locally or supplied as an encrypted data package). Lastly, the resulting report is outputted to the relevant entities (at 1190).

Any of the above modalities of operation provide the instant zero-trust architecture with the ability to process a data source with an algorithm without the ability for the algorithm developer to have access to the data being processed, the data steward being unable to view the algorithm being used, or the core management system from having access to either the data or the algorithm. This uniquely provides each party the peace of mind that their respective valuable assets are not at risk, and facilitates the ability to easily, and securely, process datasets.

Figure 12:
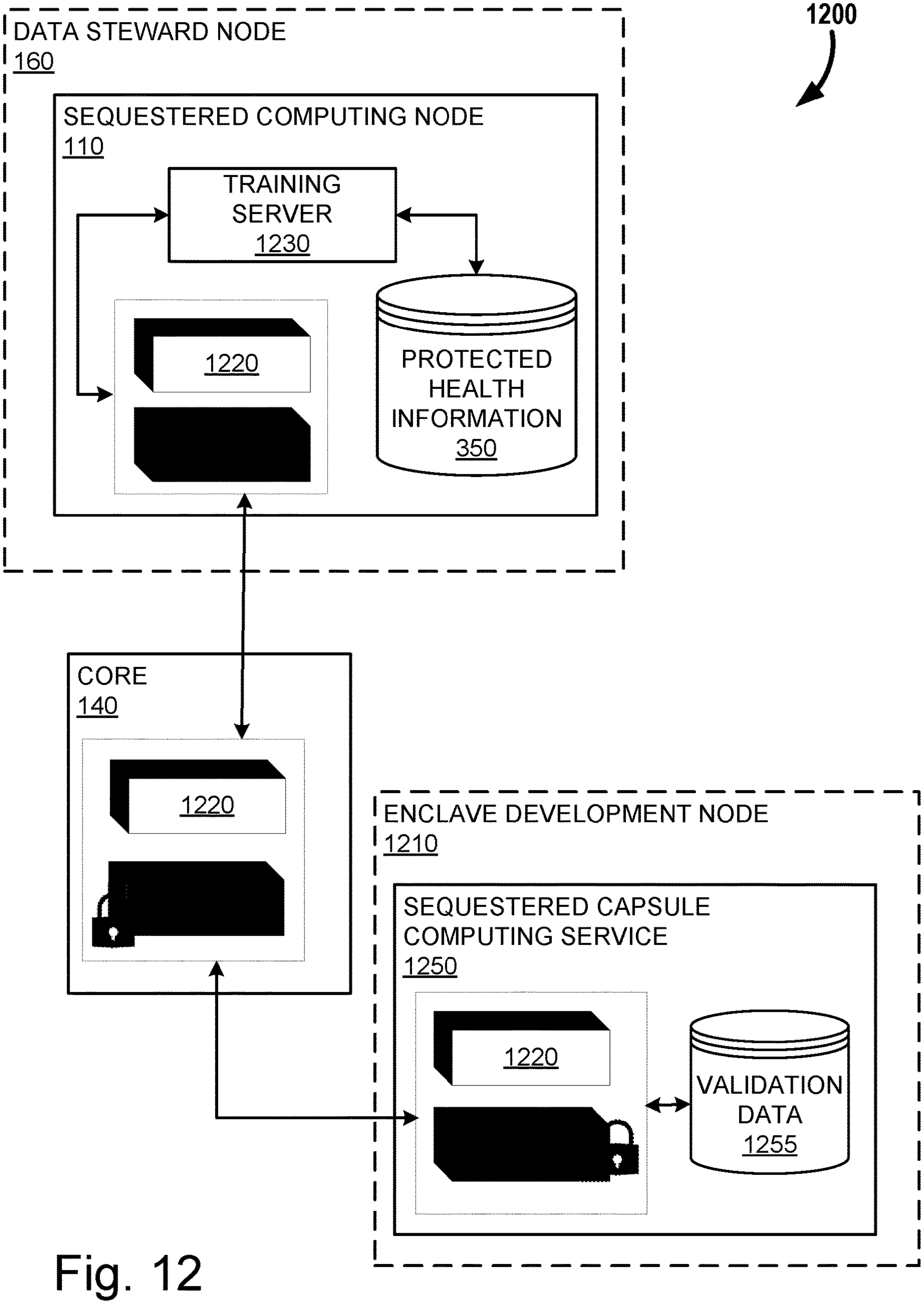
FIG. 12 is an example block diagram showing the training of the model within a zero-trust environment, in accordance with some embodiments.

Turning now to FIG. 12, a system for zero-trust training of algorithms is presented, generally at 1200. Traditionally, algorithm developers require training data to develop and refine their algorithms. Such data is generally not readily available to the algorithm developer due to the nature of how such data is collected, and due to regulatory hurdles. As such, the algorithm developers often need to rely upon other parties (data stewards) to train their algorithms. As with running an algorithm, training the algorithm introduces the potential to expose the algorithm and/or the datasets being used to train it.

In this example system, the nascent algorithm is provided to the sequestered computing node 110 in the data steward node 160. This new, untrained algorithm may be prepared by the algorithm developer (not shown) and provided in the clear to the sequestered computing node 110 as it does not yet contain any sensitive data. The sequestered computing node leverages the locally available protected health information 350, using a training server 1230, to train the algorithm. This generates a sensitive portion of the algorithm 1225 (generally the weights and coefficients of the algorithm), and a non-sensitive portion of the algorithm 1220. As the training is performed within the sequestered computing node 110, the data steward 160 does not have access to the algorithm that is being trained. Once the algorithm is trained, the sensitive portion 1225 of the algorithm is encrypted prior to being released from the sequestered computing enclave 110. This partially encrypted payload is then transferred to the data management core 140, and distributed to a sequestered capsule computing service 1250, operating within an enclave development node 1210. The enclave development node is generally hosted by one or more data stewards.

The sequestered capsule computing node 1250 operates in a similar manner as the sequestered computing node 110 in that once it is "locked" there is no visibility into the inner workings of the sequestered capsule computing node 1250. As such, once the algorithm payload is received, the sequestered capsule computing node 1250 may decrypt the sensitive portion of the algorithm 1225 using a public-private key methodology. The sequestered capsule computing node 1250 also has access to validation data 1255. The algorithm is run against the validation data, and the output is compared against a set of expected results. If the results substantially match, it indicates that the algorithm is properly trained, if the results do not match, then additional training may be required.

Figure 13:
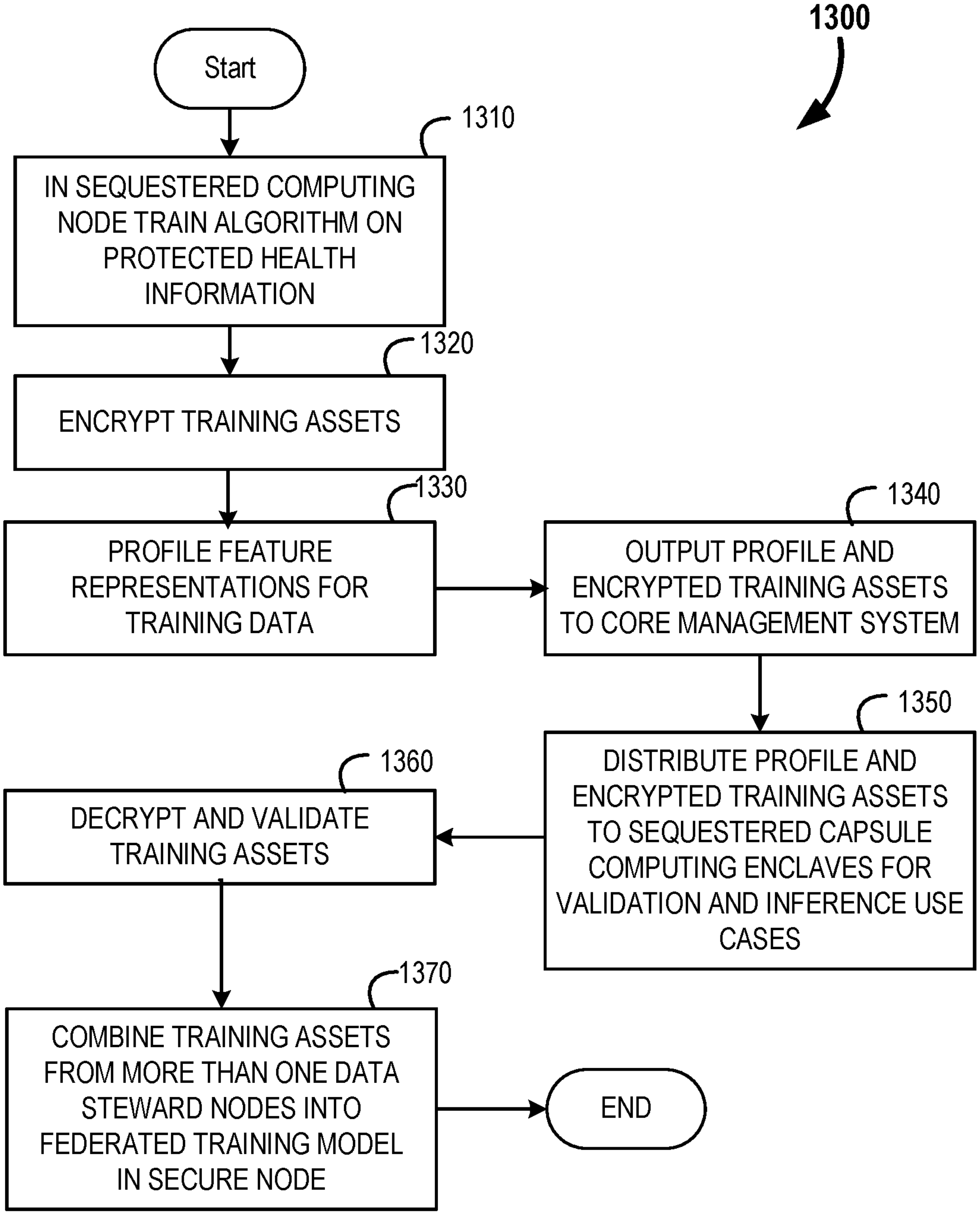
FIG. 13 is a flowchart for an example process of training of the model within a zero-trust environment, in accordance with some embodiments.

FIG. 13 provides the process flow, at 1300, for this training methodology. In the sequestered computing node, the algorithm is initially trained (at 1310). The training assets (sensitive portions of the algorithm) are encrypted within the sequestered computing node (at 1320). Subsequently the feature representations for the training data are profiled (at 1330). One example of a profiling methodology would be to take the activations of the certain AI model layers for samples in both the training and test set, and see if another model can be trained to recognize which activations came from which dataset. These feature representations are non-sensitive, and are thus not encrypted. The profile and the encrypted data assets are then output to the core management system (at 1340) and are distributed to one or more sequestered capsule computing enclaves (at 1350). At the sequestered capsule computing node, the training assets are decrypted and validated (at 1360). After validation the training assets from more than one data steward node are combined into a single featured training model (at 1370). This is known as federated training.

Figure 14:
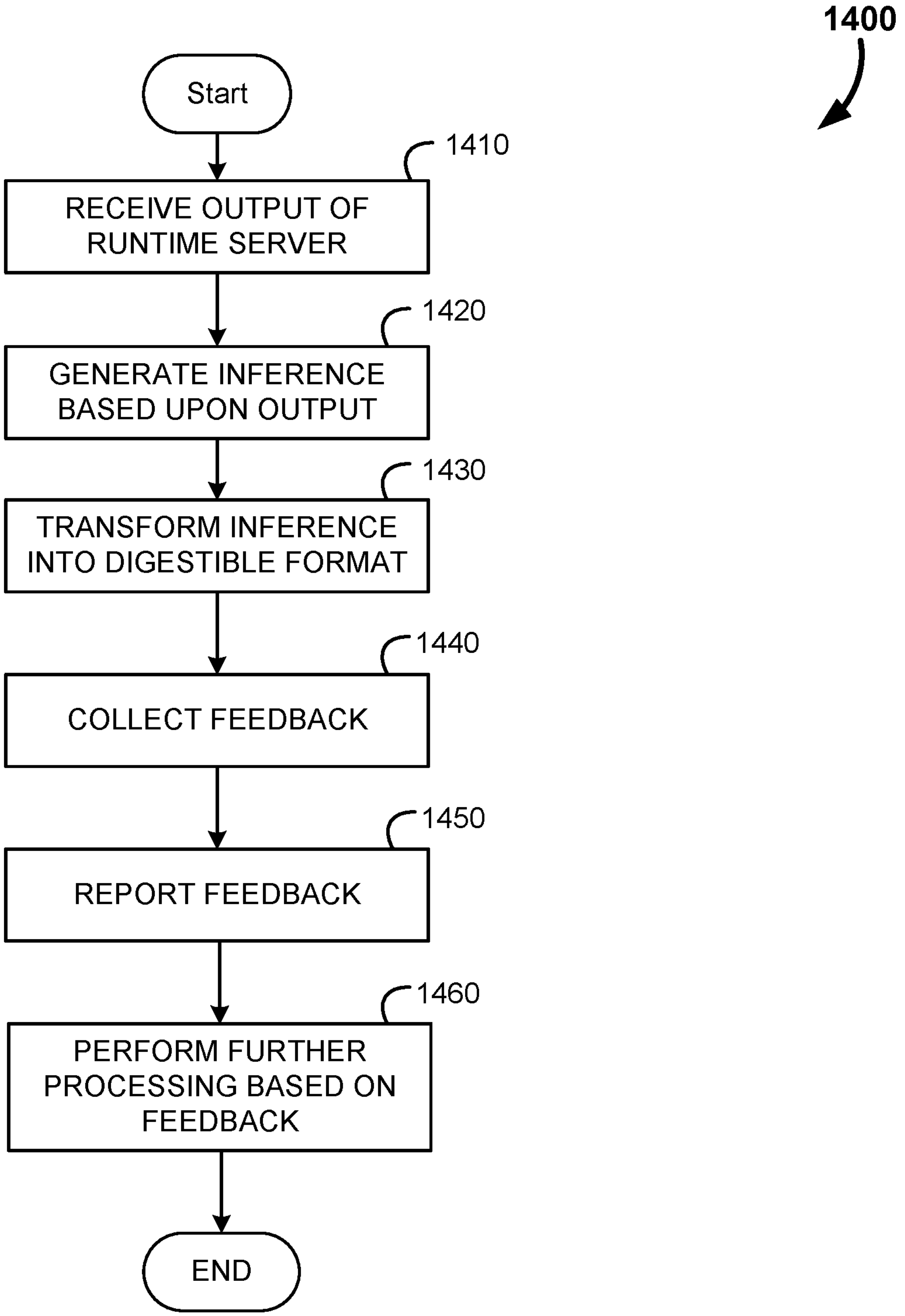
FIG. 14 is a flowchart for an example process of federated feedback, in accordance with some embodiments.

Turning now to FIG. 14 which provides a flowchart for an example process 1400 of federated feedback, in accordance with some embodiments. In this example process, output for the runtime server, in the form of dataframe events, may be received (at 1410). The inferences are generated by the algorithm (at 1420) and then are provided out to the inference interaction module. The inferences and dataframes are decrypted when being transferred out of the sequestered computing node to the inference interaction module (located in the data steward's environment). The inference interaction module may transform (at 1430) the inferences into a format that is digestible by the data stewards systems and workflows. This may be accomplished by using an API, or through direct integration into the data steward's systems (EHR or BI systems for example).

The inferences and dataframes are provided to users within the data steward for annotation. In some embodiments an annotation specification and tooling are provided along with the algorithm. The tooling and specification are provided either in an unencrypted partition of the algorithm payload, or as a separate payload from the algorithm developer to the data steward.

Figure 15:
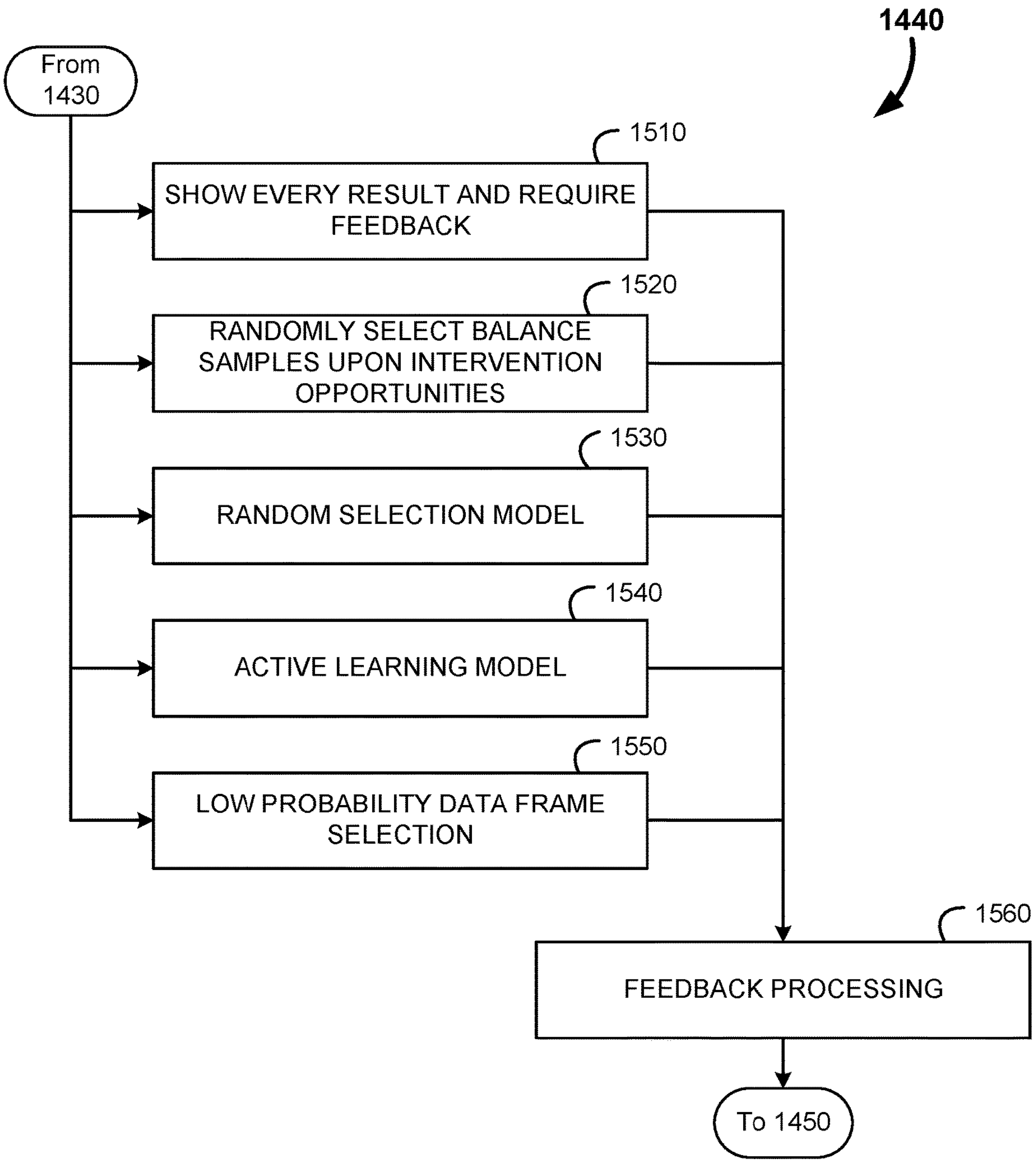
FIG. 15 is a flow diagram for the example process of feedback collection, in accordance with some embodiments.
Figure 16:
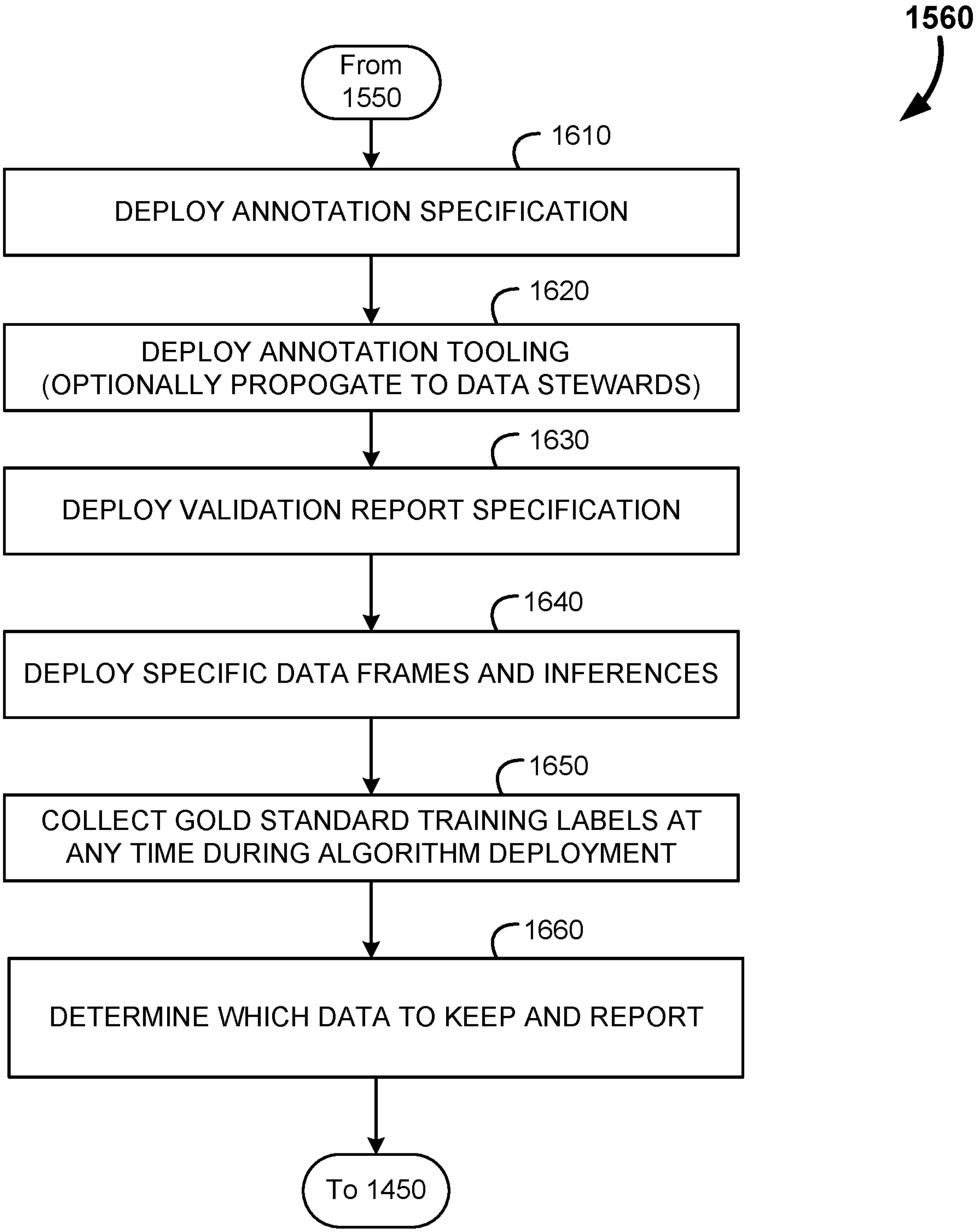
FIG. 16 is a flow diagram for the example process of feedback processing, in accordance with some embodiments.

Feedback is then collected (at 1440) from users within the data steward's environment. FIG. 15 provides a more detailed description of this feedback collection step. The dataframes and inferences made may be provided in full to users (at 1510) within the data steward's environment for annotation/inference verification. In other embodiments, only random inference/dataframe samples that are identified as being intervention opportunities are provided to the user(s) for annotation (at 1520). Other randomized sampling models may also be employed (at 1530) for the collection of feedback. In yet other embodiments, active learning (at 1540), or other pseudorandom sampling techniques such as low probability dataframes selection (at 1550), may be employed to collect user feedback on the algorithm results. This feedback is collected and processing may be performed (at 1560). This localized processing may include generation of aggregate statistics or other performance reporting. FIG. 16 is a flow diagram for the example process of feedback processing, in accordance with some embodiments. In this process, the annotation specification is first deployed (at 1610). Likewise the annotation tooling is made available (at 1620) to the user(s). A validation report specification is also deployed (at 1630), and the selected dataframes and inferences are provided as well (at 1640). The user(s) utilize the tooling and specifications to generate "gold standard" training labels. These gold standard training labels may be collected (at 1650) at any time during algorithm deployment. Lastly, a pruning step may occur, where there is a determination on which data is kept versus being discarded (1660).

Returning to FIG. 14, the collected feedback is provided back to the sequestered computing node (at 1450). This reporting of the feedback includes a re-encryption of the feedback before it is archived within the data store. The feedback includes the inference, dataframe and annotation. Generally, the annotation includes an indication if there is agreement or disagreement with the inference, the reason for the disagreement (when present) and/or the correct answer to the dataframe inference.

Once the feedback is available to the runtime server, additional processing may be performed (at 1460). This includes local tuning of the algorithm and performance reporting.

Figure 17:
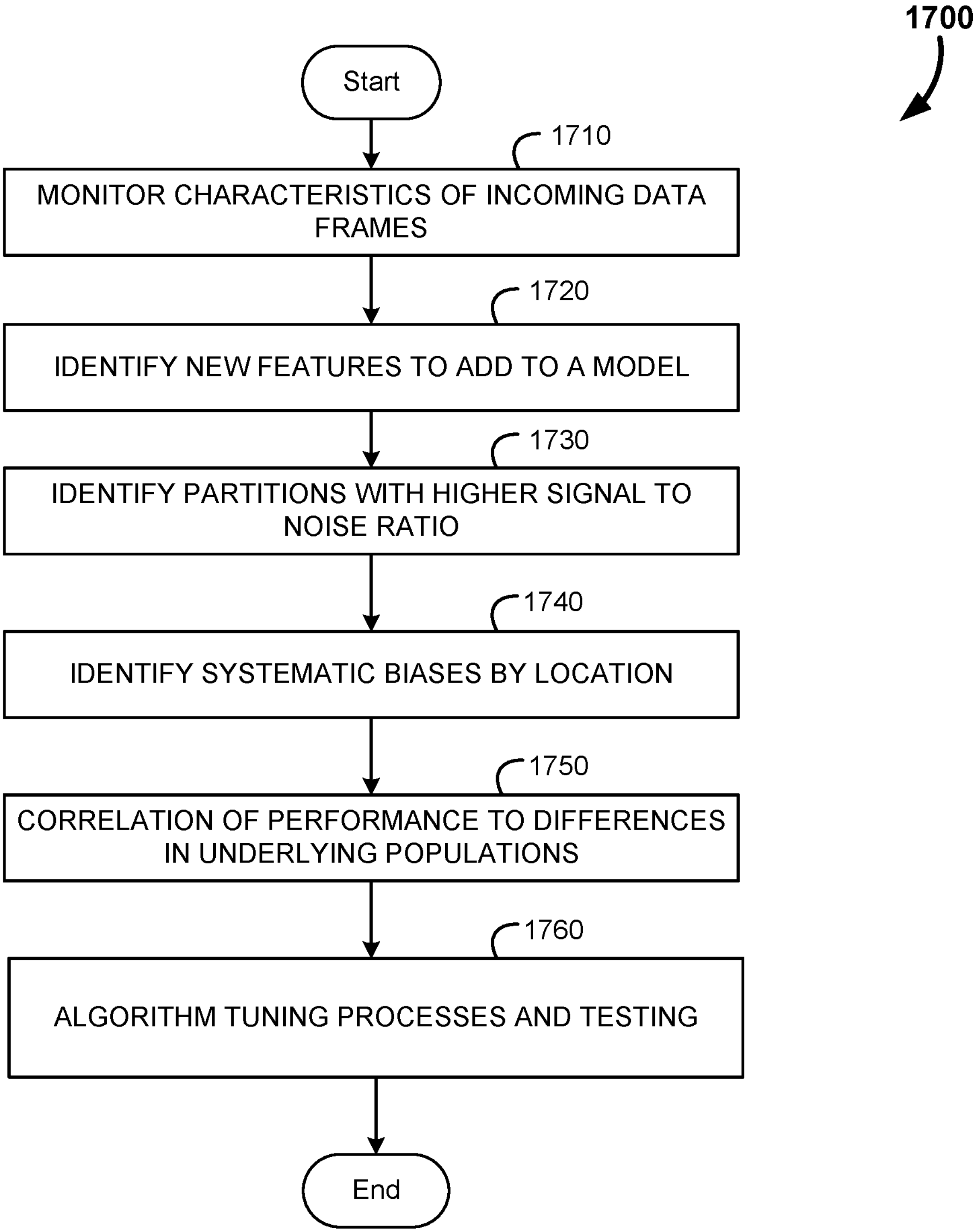
FIG. 17 is a flow diagram for the example process of runtime server operation, in accordance with some embodiments.

FIG. 17 is a flow diagram for the example process 1700 of runtime server operation, in accordance with some embodiments. The runtime server monitors the characteristics of incoming dataframes (at 1710) and identifies which new features should be added to a given model (at 1720). There are various methods to identify new features, but most simply one could look at individual correlation of a data element to the labeled truth state. If the correlation for new data is high, or higher than an existing element, it may be considered. Then one could check by various modeling techniques if the new data 1) adds predictive power, (e.g. a higher AUC), and 2) does not violate false discovery rules. Partitions with higher signal to noise rations (at 1730) and systemic biases by location (at 1740) are identified. The performance of the algorithm is then correlated to differences in the underlying populations (at 1750). Lastly, the algorithm may be locally tuned and tested using feedback data and data splits (at 1760).

Figure 18:
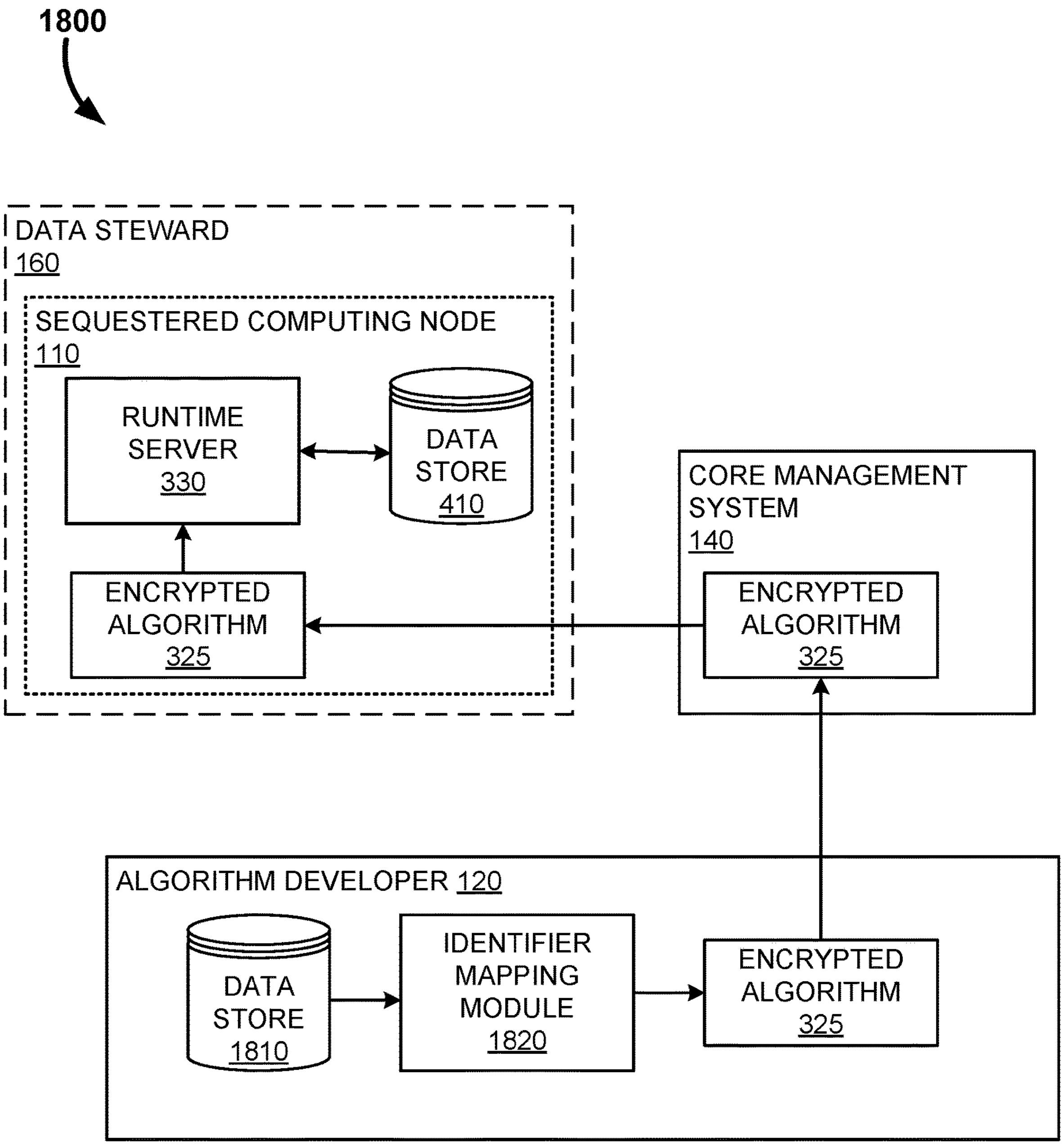
FIG. 18 is an example block diagram for identifier mapping to decrease the possibility of data exfiltration, in accordance with some embodiments.

FIG. 18 is an example block diagram for identifier mapping to decrease the possibility of data exfiltration, shown generally at 1800. Here the primary components of the system are still present: the algorithm developer 120, the core management system 140, and the data steward 160. The data steward includes a sequestered computing node 110, with notably the runtime server 330 and the protected data in a database 410. How this arrangement differs from other embodiments thus covered is the inclusion of an identifier mapping module 1820. This module consumes example data types from its own data store 1810. While this data may be contracted protected health data, it if more frequently example data that is publicly available, or even a synthetic data set.

The algorithm developer obviously contains the details of the algorithm, and particularly which types of data the algorithm 325 must consume in order to properly operate. The identifier mapping module 1820 analyzes the types of data consumed by the algorithm and determines which data type that is consumed is considered "private data" or "sensitive data" versus data that is not sensitive at all. This mapping may be converted into a data ingestion specification. By knowing which data types are sensitive or not, data obfuscation techniques may be applied to the sensitive data, but not to the insensitive data.

This is important because most data obfuscation techniques, such as differential privacy, result in a degradation of the quality of the data. In turn, lower quality data may reduce model effectiveness, as the inputs are effectively adulterated. The differentiation between "sensitive data" and non-sensitive data may be a subjective call by the algorithm developer, but is more often prescribed by either regulations (such as in the case of health information under the jurisdiction of HIPPA) or based upon the standards outlined by the data steward 160 (as is common to financial institutions).

Such a data mapping can have significant impact upon model operation, especially, at least within the healthcare industry, the variables that most heavily impact the algorithm performance are not the variables that are considered protected. HIPPA is directly focused information that identifies individuals. This kind of data includes names, social security or other identifying numbers, addresses, and the like. Many physiological data points are not able to identify the patient (e.g., BMI, chest x-rays, blood panel scores, etc.). Most models are entirely insensitive to names (although race and imputations of race by name may be impactful), address (although general neighborhoods often have impact upon health outcomes), and identifying numbers. Thus injecting significant noise and/or genericizing these values may have minimal impact upon model accuracy. In contrast, altering a chest x-ray may render the algorithm very inaccurate.

It should be noted that this mapping and selective obfuscation process, while separately described, can be used in combination with any other processes disclosed in this instant application (or a natural extension of the processes and systems said disclosure). There is nothing preventing this data mapping process from being employed in conjunction with federated training, feedback systems, automatic multi-model training, or the like.

Figure 19:
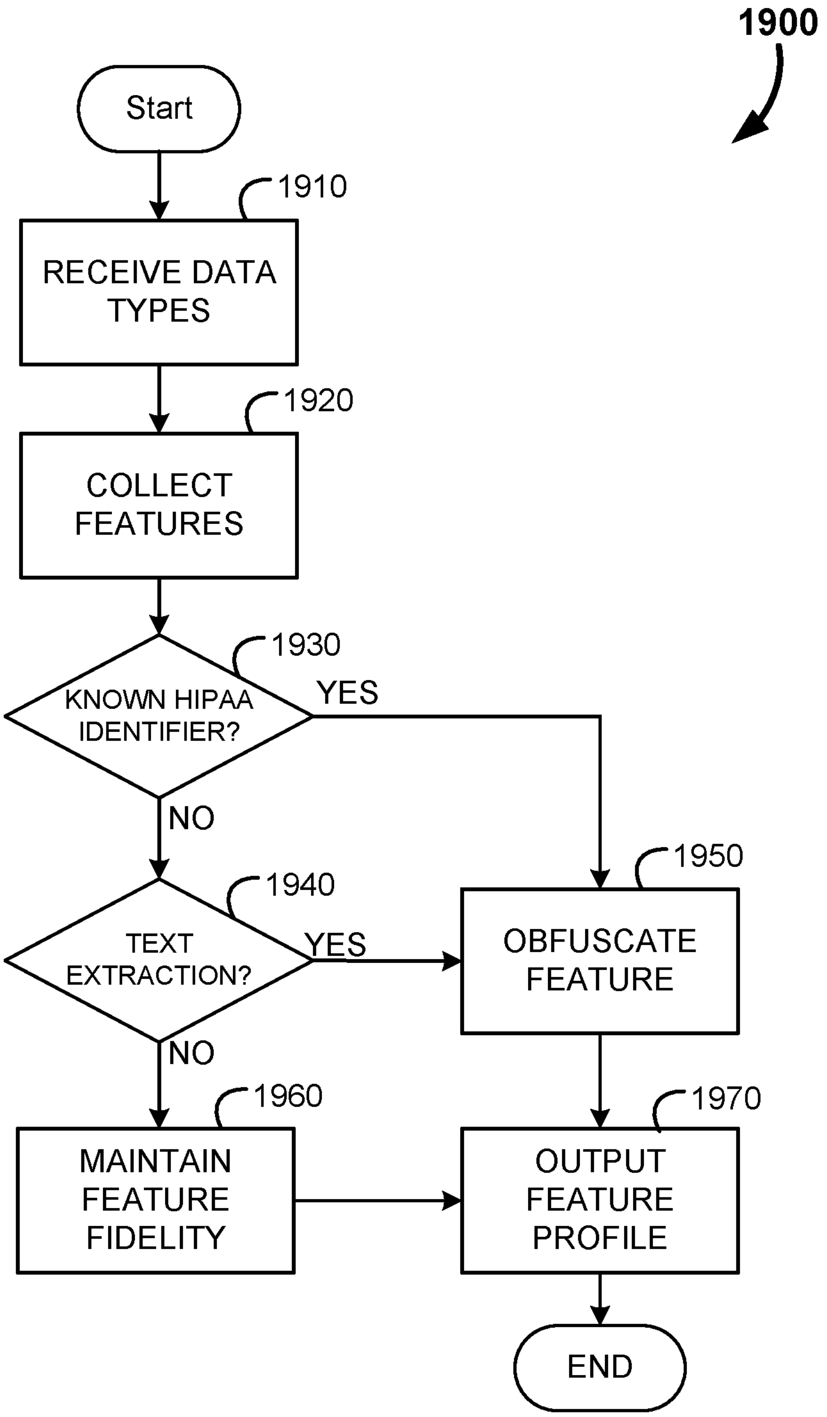
FIG. 19 is a flow diagram for an example process for identifier mapping to decrease the possibility of data exfiltration, in accordance with some embodiments.

FIG. 19 is a flow diagram 1900 for an example process for identifier mapping to decrease the possibility of data exfiltration, in accordance with some embodiments. As discussed above, the data types may first be received (at 1910). This may be via analysis of an actual dataset (real or synthetic), or could include injection of a listing of field types available provided by one or more data stewards. The features from these data types are collected (at 1920). Features include the specific data contained in each data field, and if these specific data are associated with a sensitive data class.

This example process is described in terms of the healthcare industry, and as such, the definition of what is sensitive is dictated by the HIPPA regulations. As noted before, in other contexts, classification of whether a data feature is sensitive or not may be made by the data steward(s), the algorithm developer, other governmental body, standard's organization or other potential interested party. In this specific example however, the features are compared against the known HIPAA identifiers (at 1930). If it is clearly a HIPPA identifier, the input may be segregated into a category for obfuscation (at 1950). Likewise, text data (such as free form notes by a physician) must be assumed to include HIPPA sensitive data (at 1940). Said information is also subject to appropriate obfuscation measures (at 1950). Obfuscation of free form text typically does not include the addition of noise (as would occur in differential privacy techniques), but rather may include the data being subjected to a "pre-model" which operates entirely within the sequestered computing node. Such a pre-model consumes the sensitive data, generates outputs, and then destroys any weights or results. These outputs never leave the boundaries of the sequestered computing node 110. Rather, these outputs are consumed by the main algorithm.

For example, assume the free form text notes from the physician include a paragraph of observations. The system must assume the free form text includes HIPPA regulated data. This 'pre-model' within the sequestered computing node may be trained to identify keywords, and have syntactical abilities to segment out text of interest. For example, the term "breathlessness" may be identified as a diagnostically relevant term. This term, and surrounding syntactically relevant information, may be isolated from the text data. This information is known not to be sensitive, and in this manner the free form text may be 'sterilized' of any HIPPA information. Of course, this is but one example way of data obfuscation and is not intended to be limiting. Other methodologies are also considered within the scope of this disclosure.

If the feature is decided not to be a piece of sensitive data the fidelity of the feature may be maintained (at 1950). These unadulterated features and the obfuscated features may be output as a feature profile (at 1970) that may be supplied to the data stewards prior to the execution of the algorithm on their protected data sets.

Figure 20:
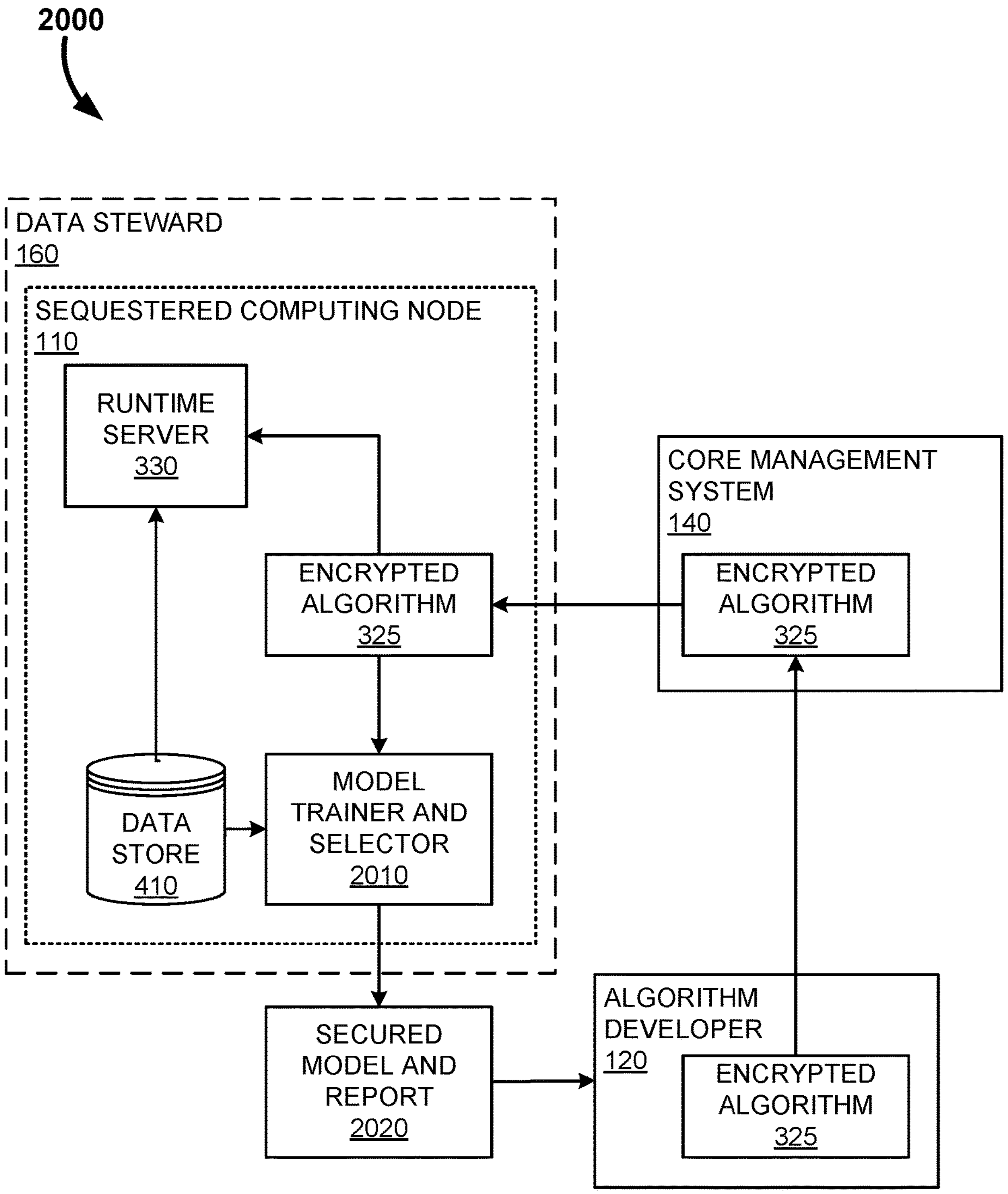
FIG. 20 is an example block diagram for auto multi-model training for improved model accuracy in a zero-trust environment, in accordance with some embodiments.
Figure 21:
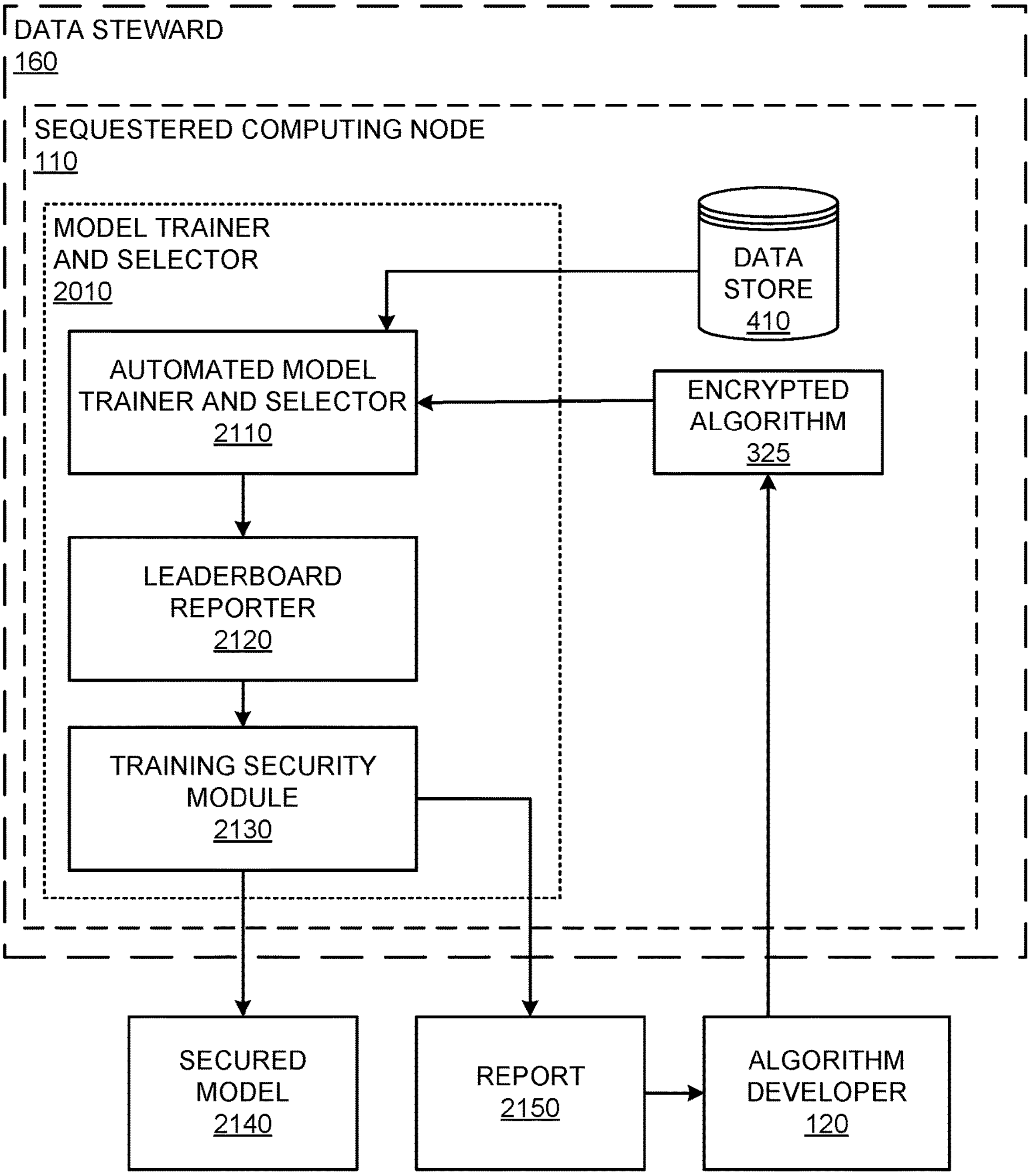
FIG. 21 is a more detailed example block diagram for a model trainer and selection module for improved model accuracy in a zero-trust environment, in accordance with some embodiments.

Switching gears slightly, FIG. 20 is an example block diagram for auto multi-model training for improved model accuracy in a zero-trust environment, shown generally at 2000. This system operates in a similar manner as the other disclosed systems and methods for zero-trust processing of protected data by an algorithm. The primary difference highlighted in this system is the inclusion of an automatic multi-model trainer and selector 2010 contained within the sequestered computing node 110 of the data steward 160. This module 2010 produces a secured model and report 2020 back to the algorithm developer 120 for improvement of their algorithm 325. The model trainer and selector module 2010 is produced in greater detail in relation to FIG. 21.

In this example, the protected data 410 and the encrypted algorithm 325 are provided to an automated model trainer and selector 2110 which leverages multi-model training upon the originally encrypted algorithm 325. Auto multi-model training consists of methods to automatically identify data inputs, models, and training strategies that result in satisfactory levels of model performance and exfiltration security. Specifically, auto multi-model training can automatically apply multiple algorithm types (regressors decision trees, neural networks, et cetera) to a machine learning training problem and then compute performance and security metrics to allow the determination of the best algorithmic strategy for each specific use case. Additional automation can be applied to the hyperparameters used to specify the training strategy (for example, termination criteria for an iterative training process, parameters to specify a regularization strategy, et cetera). Auto multi-model training can also identify transformations of input data that will result in superior algorithmic performance and security (for example combining two input fields each with a small impact on algorithm performance into a single field with a larger and potentially more robust impact on algorithm performance) and can specify which input data fields to include or exclude from the training process to generate the best-performing final algorithm.

The results of the multiple models generated by the model trainer 2110 are sent to a leaderboard reporter 2120 which ranks the models based upon performance measures. Models may be ranked based on a wide range of algorithm performance metrics and also model privacy protection metrics, the selection of which will depend on the problem being solved and the security constraints of the algorithm developer and data owner. For example, classification problems on structured data can be characterized by accuracy, F1 score, precision and recall. Image-level classification algorithms (for example pixel-level identification of image features) could report DICE score, or other measures of aggregate classification performance. These are only examples, and there is a wide array of potential performance metrics that might be used to rank algorithms in an auto multi-model training. Security metrics can include measures of exfiltration risk such as the epsilon parameter in a differential privacy security model, or can characterize the exfiltration risk in terms of how much overfitting of training data is observed in the model. Again, there is a wide array of potential security metrics that can be computed, reported and used in the selection of the preferred algorithmic solution to a particular problem. The top model of the leaderboard is then selected for security improvements within the training security module 2130. This activity may include the analysis of how much leakage the model produces, the degree that data exfiltration could occur, and other security concerns of the model. The model may then be adjusted, or data input specification may be altered, in order to increase model security to an acceptable level. This process may be iterative. The output of the training security module 2130 includes a secured model 2140 and a report 2150, both of which may be provided back to the algorithm developer. The report may further be disseminated among other interested parties, such as regulators, in some instances. The security model report can include any number of security metrics, including measures of exfiltration risk (such as the epsilon parameter in a differential privacy security model), or a characterization of the exfiltration risk in terms of how much overfitting of training data is observed in the model. Again, there is a wide array of potential security metrics that can be computed, reported and used in the selection of the preferred algorithmic solution to a particular problem. The report 2150, when provided to the algorithm developer 120 may be leveraged in the updating of the algorithm 325.

Figure 22:
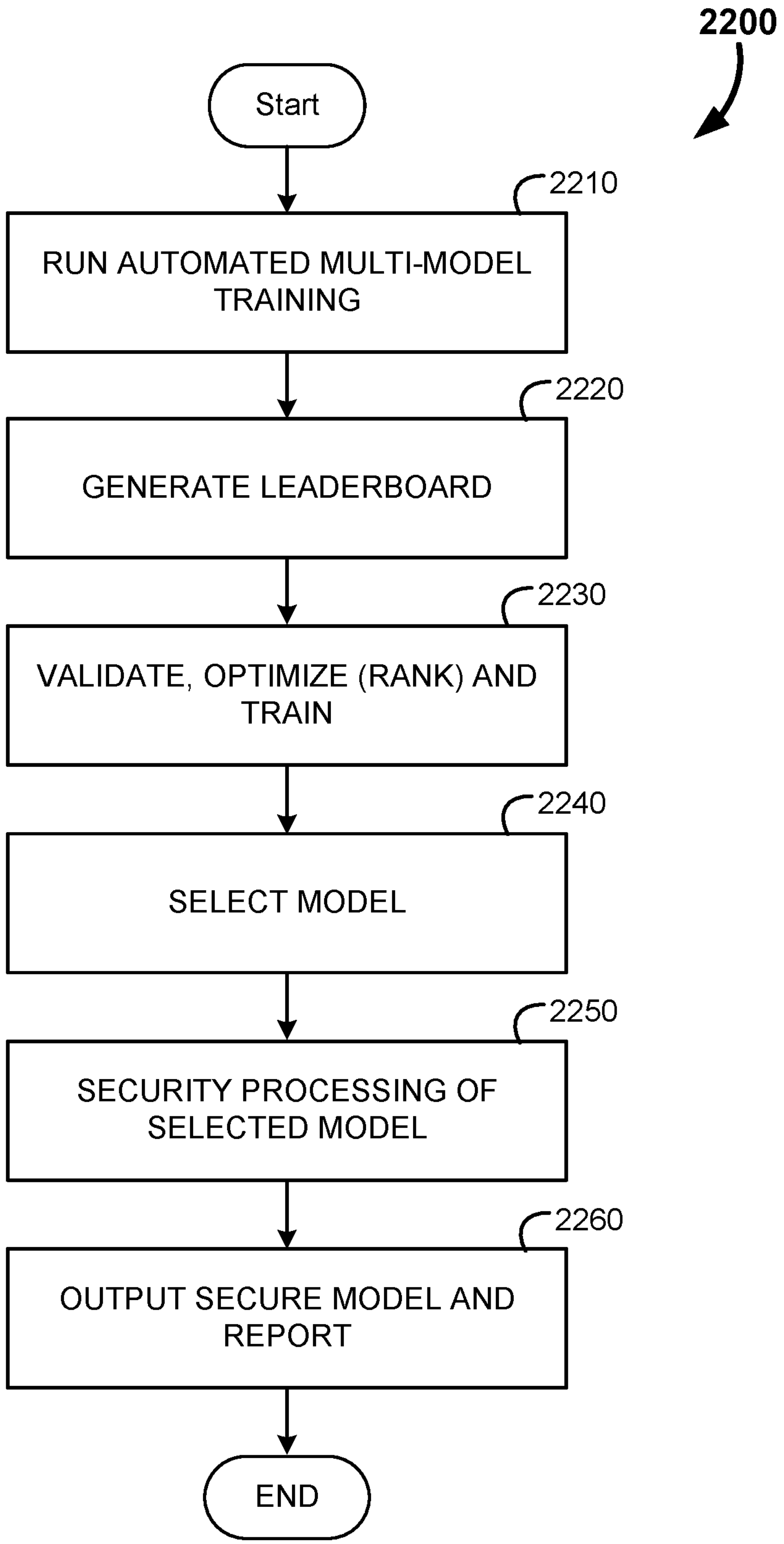
FIG. 22 is a flow diagram for an example process for auto multi-model training for improved model accuracy in a zero-trust environment, in accordance with some embodiments.

FIG. 22 is a flow diagram 2200 for an example process for auto multi-model training for improved model accuracy in a zero-trust environment, in accordance with some embodiments. As noted previously, automated multi-model training is performed (at 2210). This results in a leaderboard of the various models that are trained (at 2220). The models are each validated, optimized, and trained (at 2230). Optimization includes potentially ranking the models by a wide range of algorithm performance metrics and also model privacy protection metrics, the selection of which will depend on the problem being solved and the security constraints of the algorithm developer and data owner. For example, classification problems on structured data can be characterized by accuracy, F1 score, precision and recall. Image-level classification algorithms (for example pixel-level identification of image features) could report DICE score, or other measures of aggregate classification performance. These are only examples, and there is a wide array of potential performance metrics that might be used to rank algorithms in an auto multi-model training. In some embodiments, a hybrid score may be computed that includes information from all of the other performance and security metrics and which allows a final ranking of the models. Such a hybrid score can be used to automate the final selection of the preferred model. Once a preferred model is selected, additional training may be done to tune the performance to achieve very specific algorithm capabilities, depending upon the application. For example, in the development of a healthcare screening technology, once an algorithmic approach for a classifier is adopted, it may still be necessary to set an operating point on the Receiver Operating Curve to ensure the right mix of false positives and false negatives in the care setting that the screener is being used.

The highest ranked validated model is then selected (at 2240). The selected model is processed for security (at 2250). Security processing includes determining the risk of exfiltration of data by the model. This could include direct scan of the data for presence of PHI, addition of noise to least significant digits of model weights, or truncation of model weights. The model may also be altered in order to reduce data exfiltration chances. This may include weight truncating, or addition of random weights. Lastly, the secure model and a report are output for consumption by the algorithm developer and further interested parties. Part of the report(s) generated may include information regarding what data needs to be improved for quality and/or security (e.g., differential privacy techniques, addition of data to certain parts of the parameter space, etc.).

Figure 23:
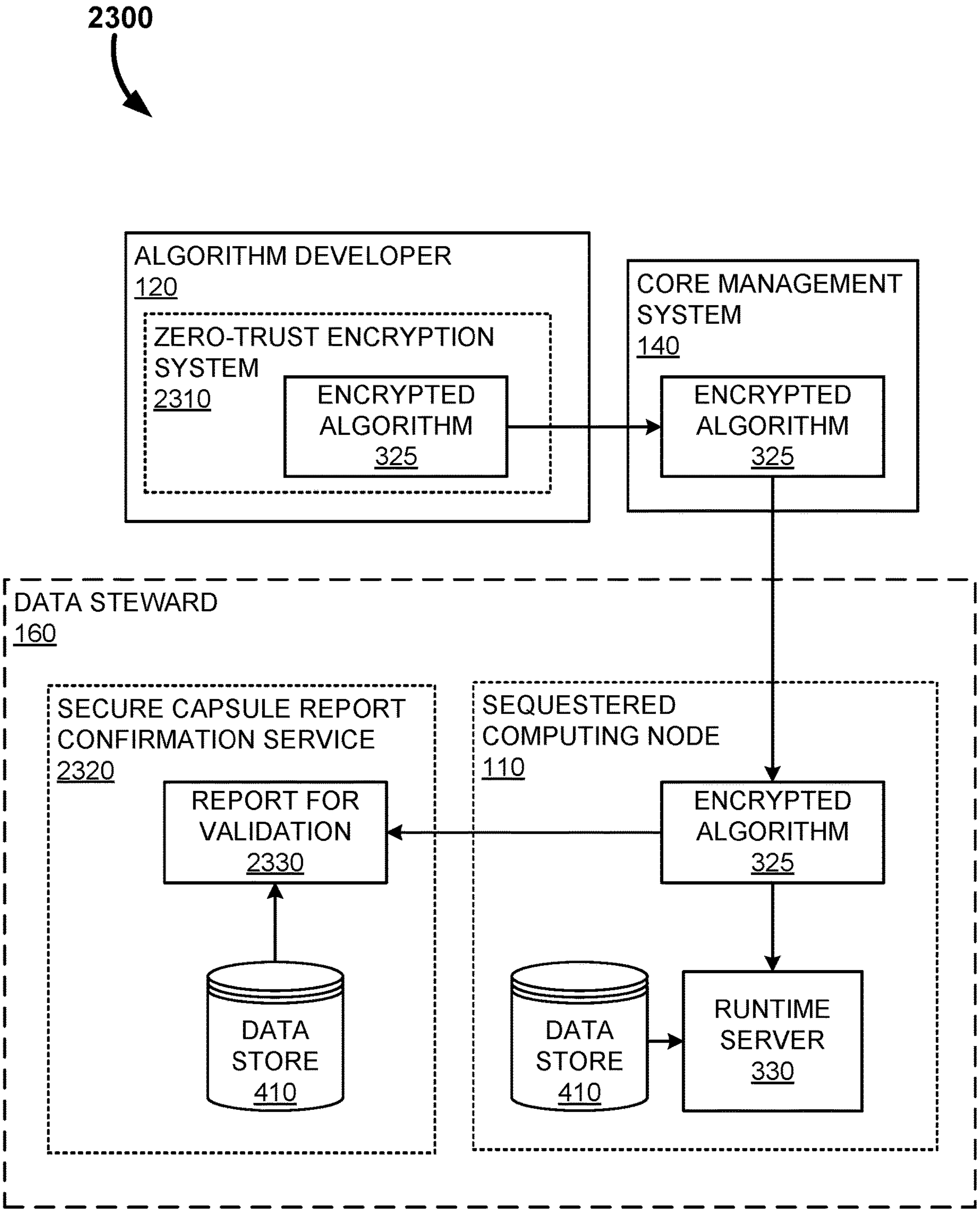
FIG. 23 is an example block diagram for secure report and confirmation in a zero-trust environment, in accordance with some embodiments.

FIG. 23 is an example block diagram for secure report and confirmation in a zero-trust environment, shown generally at 2300. In this system the algorithm developer is shown having a zero-trust encryption system 2310 in which the algorithm 325 is encrypted. The encrypted algorithm 325 is provided, via the core management system 140 to the data steward 160. In this system, the data steward 160 includes the sequestered computing node 110 in which the normal processing of the algorithm on the protected data set 410 occurs using the runtime server 330. However, additionally, the encrypted algorithm 325 report that is generated in the manner discussed previously may be provided to a secure capsule report confirmation service 2320. Within this zero-trust environment, the report for validation 2330 can also access the data store 410 to validate the algorithm.

Figure 24:
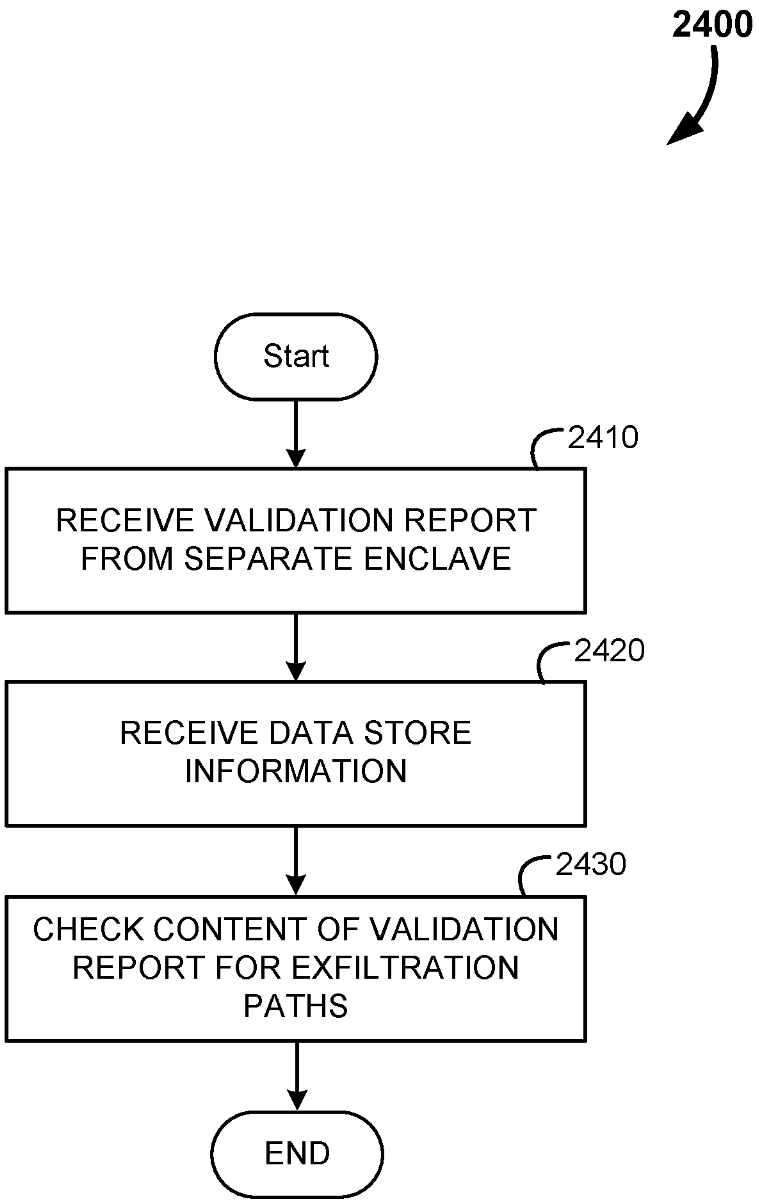
FIG. 24 is a flow diagram for an example process for secure report and confirmation in a zero-trust environment, in accordance with some embodiments.

FIG. 24 is a flow diagram 2400 for an example process for secure report and confirmation in a zero-trust environment, in accordance with some embodiments. In this process, the validation report is received from a separate enclave (at 2410). Since the validation report is from a separate enclave, the current enclave has zero access to the algorithm itself, thereby preventing any compromising of the confirmation code by the algorithm itself. The system may also receive the protected data from the data steward's data store (at 2420). The content of the validation report is then checked to determine the contents of the algorithm report, and as the protected data is known, check for any instance of data exfiltration (at 2430).

Figure 25:
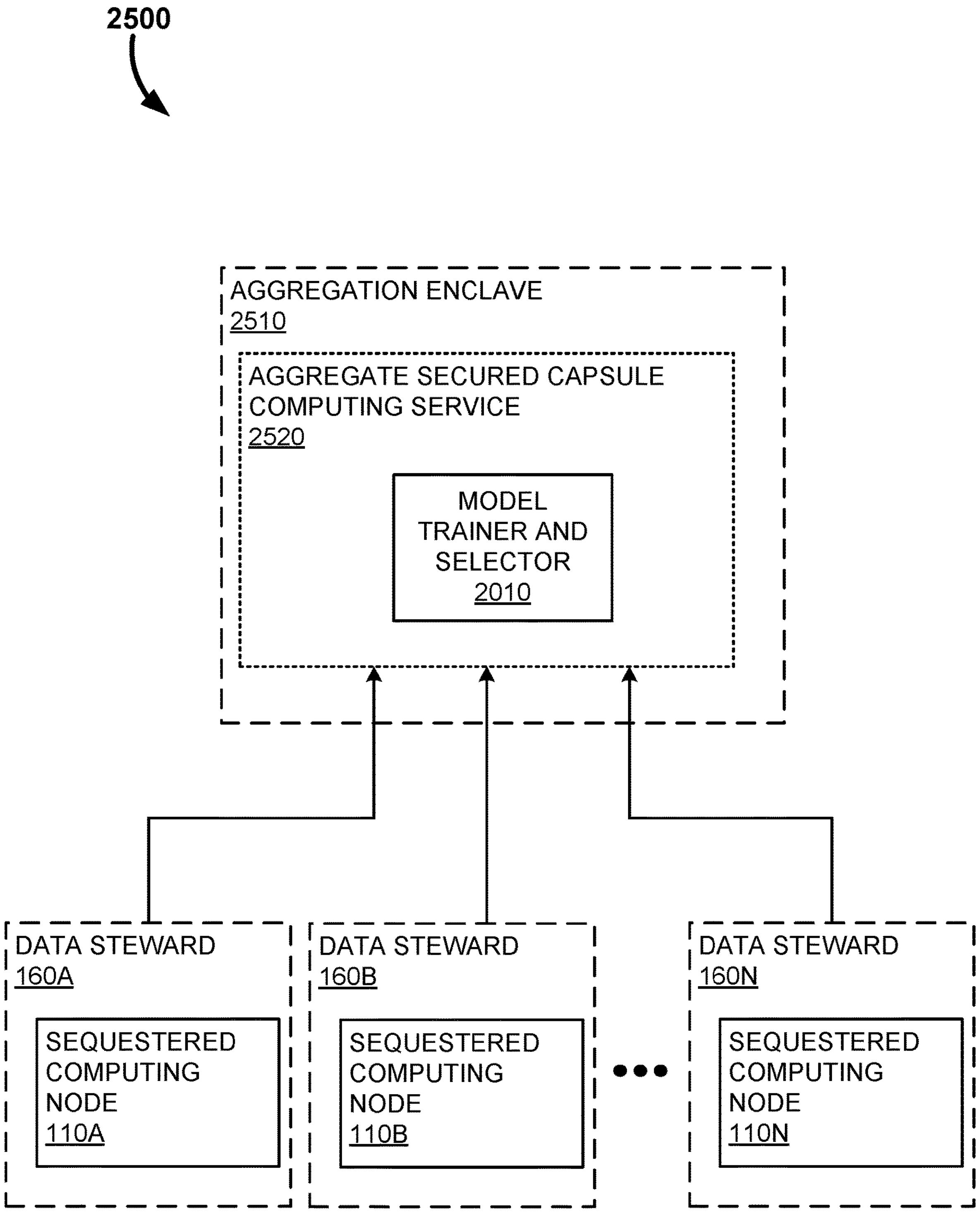
FIG. 25 is an example block diagram for an aggregation of multi-model training in a zero-trust environment, in accordance with some embodiments.

FIG. 25 is an example block diagram for an aggregation of multi-model training in a zero-trust environment, shown generally at 2500. In this example system there are multiple data stewards 160*a-n* are shown, each with their own computing node 110*a-n*. In this example system, each data steward 160*a-n* performs a training process. This may include simple model training, or the above disclosed automated multi-model training. The resulting algorithms are each provided to an aggregation enclave 2510, which itself has a secure capsule computing service 2520. Within the aggregated secure capsule computing service 2520 the various models may be aggregated by federated learning techniques, or the process may include yet another iteration of automated multi-model training (leaderboard ranking and selection). Regardless of which model is generated/selected, the model trainer and selector 2010 may undergo the security processing on the trained/selected model. In this system, locally identified exfiltration risk may be sent securely to the aggregated secure capsule computing service 2520 for the enhancement in data selection. Local automated training profiles are combined in the aggregated secure capsule computing service 2520 to improve the aggregation model.

Figure 26:
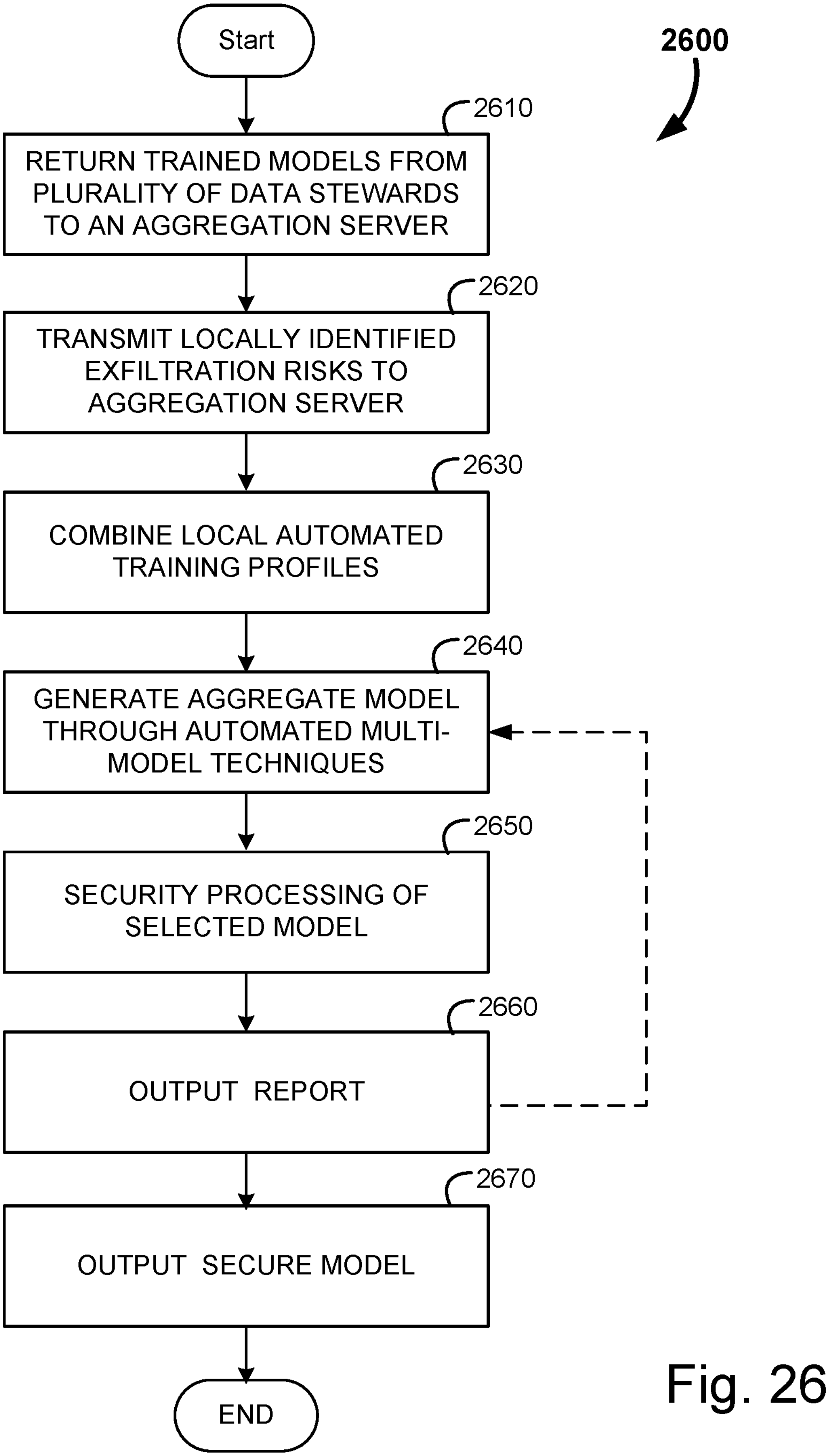
FIG. 26 is a flow diagram of an example process for an aggregation of multi-model training in a zero-trust environment, in accordance with some embodiments.

FIG. 26 is a flow diagram 2600 of an example process for an aggregation of multi-model training in a zero-trust environment, in accordance with some embodiments. In this process the trained models are returned from the various data stewards to the aggregation server (at 2610). Locally identified exfiltration risks are also provided to the aggregation server (at 2620). The locally automated training profiles are then combined (at 2630). The presence of exfiltration risk from locally trained models can be addressed from a portfolio perspective in the aggregation secure capsule. This results in an aggregate model that has lower exfiltration risk than the exfiltration risks in the locally trained models.

The aggregate model is then generated through automated multi-model techniques (at 2640) in a manner similar to what has already been disclosed. In the aggregation server the selected model is then processed for security (at 2650), again as provided previously. This generates a model report (at 2660) that may be output to relevant third parties, including the algorithm developer. Feedback from the algorithm developer may be used to assist in the generation of new aggregation models in an iterative manner, in some embodiments. Eventually a secure aggregated model is generated that may be outputted (at 2670).

Figure 27A:
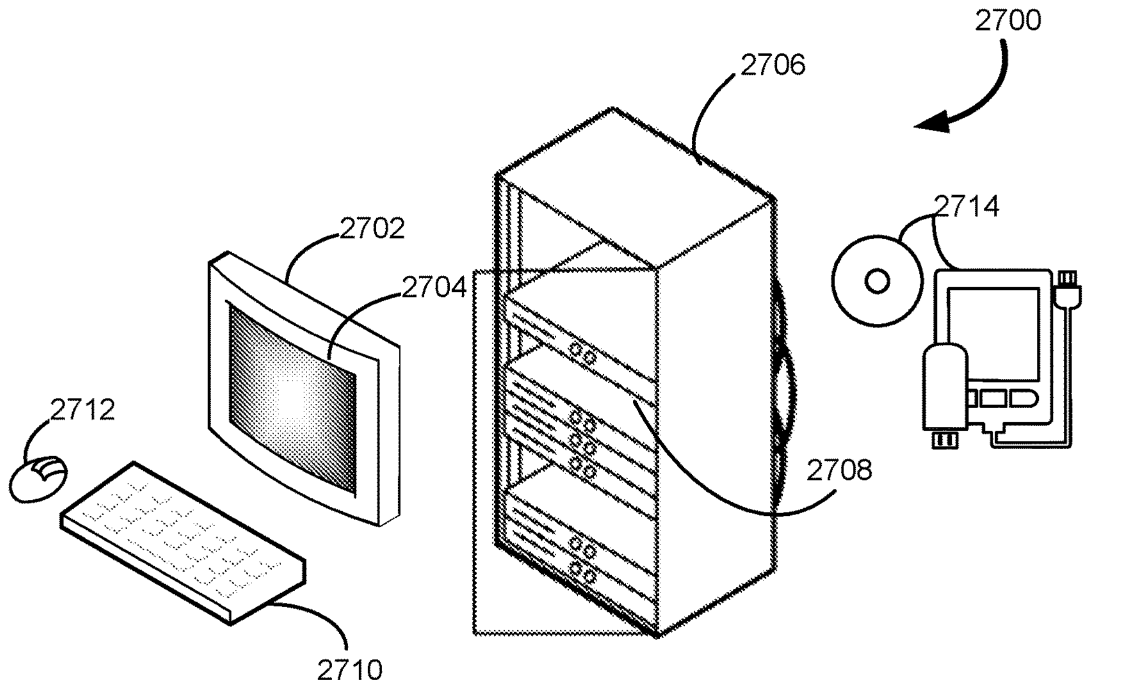
FIGS. 27A and 27B are illustrations of computer systems capable of implementing the zero-trust computing, in accordance with some embodiments.
Figure 27B:
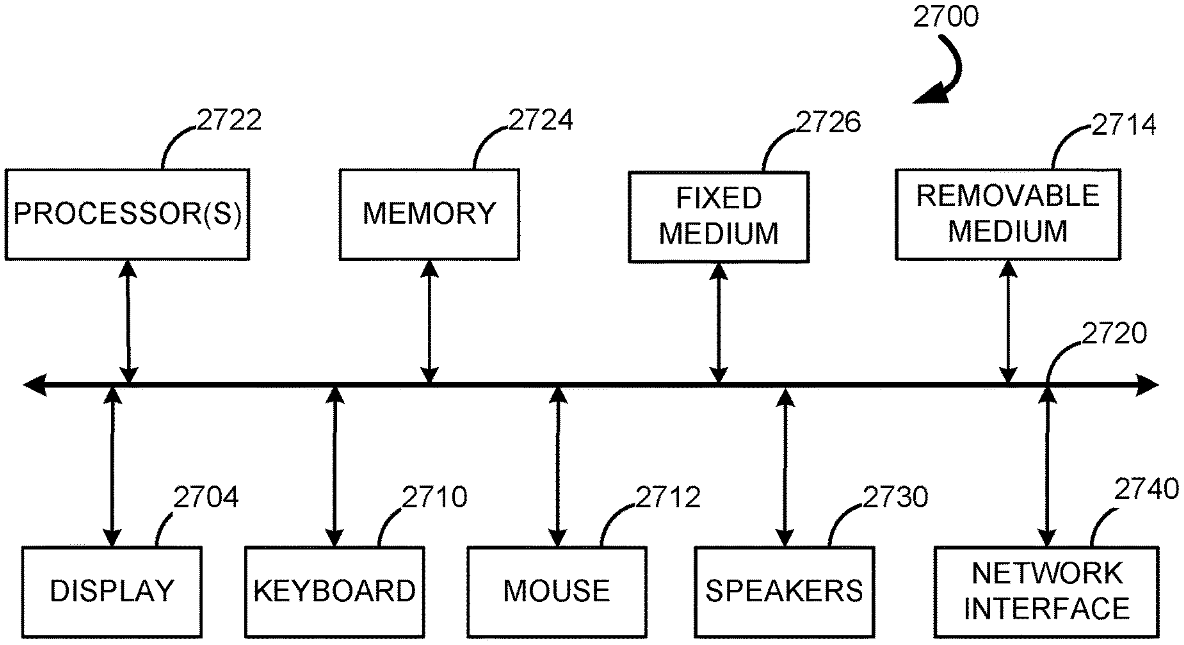

Now that the systems and methods for zero-trust computing have been provided, attention shall now be focused upon apparatuses capable of executing the above functions in real-time. To facilitate this discussion, FIGS. 27A and 27B illustrate a Computer System 2700, which is suitable for implementing embodiments of the present invention. FIG. 27A shows one possible physical form of the Computer System 2700. Of course, the Computer System 2700 may have many physical forms ranging from a printed circuit board, an integrated circuit, and a small handheld device up to a huge supercomputer. Computer system 2700 may include a Monitor 2702, a Display 2704, a Housing 2706, server blades including one or more storage Drives 2708, a Keyboard 2710, and a Mouse 2712. Medium 2714 is a computer-readable medium used to transfer data to and from Computer System 2700.

FIG. 27B is an example of a block diagram for Computer System 2700. Attached to System Bus 2720 are a wide variety of subsystems. Processor(s) 2722 (also referred to as central processing units, or CPUs) are coupled to storage devices, including Memory 2724. Memory 2724 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable form of the computer-readable media described below. A Fixed Medium 2726 may also be coupled bi-directionally to the Processor 2722; it provides additional data storage capacity and may also include any of the computer-readable media described below. Fixed Medium 2726 may be used to store programs, data, and the like and is typically a secondary storage medium (such as a hard disk) that is slower than primary storage. It will be appreciated that the information retained within Fixed Medium 2726 may, in appropriate cases, be incorporated in standard fashion as virtual memory in Memory 2724. Removable Medium 2714 may take the form of any of the computer-readable media described below.

Processor 2722 is also coupled to a variety of input/output devices, such as Display 2704, Keyboard 2710, Mouse 2712 and Speakers 2730. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, motion sensors, brain wave readers, or other computers. Processor 2722 optionally may be coupled to another computer or telecommunications network using Network Interface 2740. With such a Network Interface 2740, it is contemplated that the Processor 2722 might receive information from the network, or might output information to the network in the course of performing the above-described zero-trust processing of protected information, for example PHI. Furthermore, method embodiments of the present invention may execute solely upon Processor 2722 or may execute over a network such as the Internet in conjunction with a remote CPU that shares a portion of the processing.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this disclosure. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

In operation, the computer system 2700 can be controlled by operating system software that includes a file management system, such as a medium operating system. One example of operating system software with associated file management system software is the family of operating systems known as Windows® from Micro soft Corporation of Redmond, Washington, and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The algorithms and displays presented herein are not inherently related to any particular computer or other apparatus. Various general-purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may, thus, be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, Glasses with a processor, Headphones with a processor, Virtual Reality devices, a processor, distributed processors working together, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer (or distributed across computers), and when read and executed by one or more processing units or processors in a computer (or across computers), cause the computer(s) to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A computerized method of secure model generation in a sequestered computing node comprising:

receiving an algorithm in a secure computing enclave, wherein the algorithm is a plurality of algorithms received from a plurality of data stewards;

receiving training data in the secure computing enclave;

mapping the training data by Health Insurance Portability and Accountability Act (HIPAA) sensitivity categories, wherein the mapping identifies sensitive data categories and non-sensitive data categories;

obfuscating the sensitive data categories to generate partially obfuscated training data;

performing automated multi-model training on the algorithm to generate a plurality of trained models, wherein the multi-model training includes training by applying regressors, decision trees, and neural networks to a single machine learning training problem using the partially obfuscated training data;

generating a leaderboard of the plurality of trained models;

ranking the plurality of trained models in the leaderboard based upon a hybrid metric calculated by combining an epsilon parameter for each model with a DICE score;

selecting a top model from the leaderboard; and performing security processing on the top model to generate a secure model.

2. The method of claim 1, wherein the ranking the plurality of trained models is by data exfiltration risk.

3. The method of claim 1, wherein the ranking the plurality of trained models is by accuracy.

4. The method of claim 1, wherein the security processing includes at least one of weight truncation and additional weight addition.

5. The method of claim 1, further comprising:

generating a report on performance of the secure model;

providing the report to a separate secure report confirmation service;

providing protected data to the secure report confirmation service; and validating the report for data exfiltration by comparison to the secure report confirmation service.

* * * * *